(12) United States Patent  (10) Patent No.: US 8,159,162 B2
Kanamori  (45) Date of Patent: Apr. 17, 2012

(54) MOTOR CONTROL APPARATUS, VEHICLE FAN DRIVE APPARATUS, AND MOTOR CONTROL METHOD

(75) Inventor: Atsushi Kanamori, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 699 days.

(21) Appl. No.: 12/292,353

(22) Filed: Nov. 18, 2008

(65) Prior Publication Data
US 2009/0167220 A1  Jul. 2, 2009

(30) Foreign Application Priority Data

Dec. 28, 2007 (JP) ................................. 2007-339026
Aug. 18, 2008 (JP) ................................. 2008-209731
Aug. 18, 2008 (JP) ................................. 2008-209732

(51) Int. Cl.
*H02P 1/50* (2006.01)
(52) U.S. Cl. .................. 318/400.11; 318/708; 318/801; 318/807; 318/811
(58) Field of Classification Search ............ 318/400.11, 318/708, 801, 807, 811
See application file for complete search history.

(56) References Cited

U.S. PATENT DOCUMENTS

| | | | |
|---|---|---|---|
| 6,104,152 | A | 8/2000 | Coles et al. |
| 6,124,688 | A | 9/2000 | Coles et al. |
| 6,462,491 | B1 * | 10/2002 | Iijima et al. ............... 318/400.34 |
| 6,483,266 | B2 * | 11/2002 | Miyazaki et al. ......... 318/400.34 |
| 6,753,667 | B2 * | 6/2004 | Sakamoto ..................... 318/433 |
| 6,774,590 | B2 | 8/2004 | Inagawa et al. |
| 6,979,970 | B2 * | 12/2005 | Iwanaga et al. ........... 318/400.35 |
| 7,304,452 | B2 * | 12/2007 | Nagai et al. .................... 318/811 |
| 2006/0197480 | A1 | 9/2006 | Mori et al. |
| 2009/0066280 | A1 | 3/2009 | Hayashi |

FOREIGN PATENT DOCUMENTS

| | | |
|---|---|---|
| JP | A-58-29380 | 2/1983 |
| JP | A-62-064290 | 3/1987 |
| JP | A-07-046881 | 2/1995 |
| JP | A-09-182485 | 7/1997 |
| JP | A-11-46493 | 2/1999 |
| JP | A-2000-069760 | 3/2000 |
| JP | A-2000-217387 | 8/2000 |
| JP | A-2002-233183 | 8/2002 |
| JP | A-2003-047273 | 2/2003 |

(Continued)

OTHER PUBLICATIONS

Office Action mailed Nov. 30, 2010 from the Japan Patent Office in corresponding patent application No. 2008-209732 (and English translation).

(Continued)

*Primary Examiner* — Walter Benson
*Assistant Examiner* — David Luo
(74) *Attorney, Agent, or Firm* — Posz Law Group, PLC

(57) ABSTRACT

A motor control apparatus has a start control section. When the motor control apparatus receives a motor start command from a host control unit when a motor is in a stop state or a low-speed rotating state where a sensorless control cannot be applied, the control section starts the motor that rotates a vehicle fan by a forced commutation which supplies a pseudo sinusoidal drive signal caused by a complementary PWM control. Thereafter, the motor control apparatus switches over to a sensorless control using a rectangular wave drive signal at an energization angle of lower than 180°.

33 Claims, 20 Drawing Sheets

FOREIGN PATENT DOCUMENTS

| | | |
|---|---|---|
| JP | A-2003-111469 | 4/2003 |
| JP | A-2003-111483 | 4/2003 |
| JP | A-2005-137069 | 5/2005 |
| JP | A-2005-160147 | 6/2005 |
| JP | A-2005-176453 | 6/2005 |
| JP | A-2006-115641 | 4/2006 |
| JP | A-2006-149097 | 6/2006 |
| JP | A-2006-230079 | 8/2006 |
| JP | A-2007-020345 | 1/2007 |
| JP | A-2007-189897 | 7/2007 |
| JP | A-2007-288938 | 11/2007 |
| JP | A-2007-318984 | 12/2007 |

OTHER PUBLICATIONS

Office Action mailed Nov. 10, 2009 for corresponding Chinese patent application No. 2008-209731 (English translation enclosed).

Office Action mailed May 25, 2010 from the Japan Patent Office in the corresponding patent application No. 2008-209732 (and English translation).

\* cited by examiner

NORMAL SINUSOIDAL WAVE

ELECTRIC ANGLE [°]

TWO-PHASE MODULATION

ELECTRIC ANGLE [°]

TWO-PHASE MODULATION (15° STEP)

MOTOR CONTROL APPARATUS, VEHICLE FAN DRIVE APPARATUS, AND MOTOR CONTROL METHOD

CROSS REFERENCE TO RELATED APPLICATION

The present application is based on and incorporates herein by reference Japanese Patent Applications No. 2007-339026 filed on Dec. 28, 2007, No. 2008-209731 filed on Aug. 18, 2008 and No. 2008-209732 filed on Aug. 18, 2008.

FIELD OF THE INVENTION

The present invention relates to a motor control apparatus and a motor control method, which control the driving of a brushless DC motor without using a position sensor and the like, and a vehicle fan drive apparatus having the motor control apparatus.

BACKGROUND OF THE INVENTION

Control systems for driving a brushless DC motor without using a position sensor such as a hole IC are classified into two (first and second) systems. In the first system, an energization (current supply) angle is less than 180°. In the second system that drives the brushless DC motor with a sinusoidal wave voltage, the energization angle is 180°.

The first control system, in which the energization angle is less than 180°, detects a zero cross point of an induced voltage which is developed in a winding wire in an energization pause interval, and performs position estimation to control the driving of the brushless DC motor. The first control system can be realized with a simple logic.

The second control system that drives the brushless DC motor with the sinusoidal wave voltage in which the energization angle is 180° cannot conduct the position estimation based on the induced voltage that is developed in the energization pause interval. For this reason, the second control system performs calculation based on the winding voltage, the winding current, and the motor constant at a high speed to estimate the position, thus controlling the driving. The second control system causes very small torque ripple. Thus, noises and vibrations can be suppressed, because the sinusoidal wave voltage is applied to the system. However, a high-precision current sensor is required, and a high-performance microcomputer is also required to conduct the high-speed calculation.

In the above sensorless control, when the motor is under suspension, or in the region where the rotation speed is low, because the position cannot be detected, forced commutation is executed so that start is performed as a synchronous motor to switch over to the sensorless control. For example, as shown in FIG. 22, in the case of conducting the sensorless control by a drive signal whose voltage waveform is rectangular waveform when the energization angle is less than 180°, start is performed by the forced commutation of the drive signal having the rectangular waveform even in the forced commutation at the time of start (for example, refer to IP 58-29380A).

For example, in a motor that is mounted in a vehicle, a difference between the highest and lowest operating environment temperatures is very large. When the atmospheric temperature rises, the winding resistance of the motor increases, and resistances of a semiconductor device and a wiring in an electronic circuit portion that mainly includes a drive device also increase. As a result, even if a voltage that is applied to the motor has the same level, a current that flows in the motor is reduced, thereby also reducing the developed torque.

Accordingly, in the case where the developed torque is reduced by a rise of the atmospheric temperature when the forced commutation is performed at the time of start, it is likely that a rotor does not follow the commutation speed of the drive circuit side, and fails to start. In order to avoid the above problem, it is necessary to apply the voltage of a sufficient level to the motor so as to prevent the deficient torque at the time of increasing the temperature.

However, it is assumed that an applied voltage is determined in response to the temperature rising time as described above. Then, when the atmospheric temperature is about a room temperature, or is lower than the room temperature, the winding resistance of the motor and the resistances of other circuit portions are reduced. As a result, the current reversely increases, and the developed torque increases. In the forced commutation that is caused by the drive signal whose voltage waveform is the rectangular waveform in which the energization angle is less than 180°, the vibrations of the motor which is attributable to the torque ripple increase, to thereby generate an abnormal noise at the time of start.

Also, the motor that is mounted in, for example, a vehicle, particularly in an engine compartment, is very severe in the operating environment, and the magnetic flux of a rotor magnet is deteriorated under the high-temperature environment. As a result, it is supposed that the amplitude level of an induced voltage that is developed in the stator winding wire at the time of rotation is also decreased, and the control cannot shift to the sensorless control. The magnetic flux is deteriorated when a rotor magnet is rusted while the motor is used for a long period of time.

In JP 2005-137069A, when it is determined from synchronized operation that the shift to the sensorless control fails, the applied voltage at the time of forced commutation increases, or a rotation speed for switching over to the sensorless control increases to retry the shift.

However, in the above system, when the failure of shifting to the sensorless control is caused by the environment or the secular change, the problem cannot be essentially solved by merely changing the control mode, and there is a risk that the restart is repeated. Then, when the applied voltage increases or the rotation speed increases to execute the forced commutation by a conventional rectangular waveform drive signal, the noise at the time of driving becomes large. As a result, a vehicle passenger may feel uncomfortable.

SUMMARY OF THE INVENTION

A first object of the present invention is to provide a motor control apparatus and a motor control method, which are capable of surely starting while suppressing abnormal noise even when the driving of a brushless DC motor is controlled by a sensorless control system using a drive signal whose energization angle is less than 180°, and a vehicle fan drive apparatus having the motor control apparatus.

A second object of the present invention is to provide a motor control apparatus, a motor control method, and a vehicle fan drive apparatus having the motor control apparatus, which are capable of surely driving the motor even when it is determined that shift to the sensorless control is difficult after the brushless DC motor starts.

In a first aspect for the first object, a brushless DC motor is driven under control through a sensorless control system that performs position estimation to execute energization according to an induced voltage that is developed in an energization pause interval at an energization angle of lower than 180°. In this case, when the start control circuit receives a start command in the case where the motor is in a stop state or in a low-speed rotating state where the sensorless control is not applied, the start control circuit starts the motor by the forced commutation of a drive signal whose applied voltage amplitude to the motor gently changes by a complementary PWM control. Thereafter, the start control circuit switches over to the sensorless control.

In the present specification, "complementary PWM control" performs the PWM control on both of the switching elements at an upper arm side and a lower arm side which constitute the inverter circuit when conducting the PWM control on the motor through the inverter circuit.

That is, in the drive state using a steady sensorless system, even in such an application that a drive sound of the motor does not become a problem even if a voltage waveform (for example, a rectangular voltage waveform of 120°) that is not smooth due to the energization angle of less than 180° is applied to the motor, the drive sound may become a problem when the motor starts from the stop state or from a low-speed rotating state of the level to which the sensorless control cannot be applied. In addition, as described above, a tradeoff exists with respect to the necessity of giving a torque for surely starting the motor.

Under the above circumstances, in the case of starting the motor from the stop state or from the low-speed rotating state, the forced commutation of a drive signal whose applied voltage amplitude to the motor gently changes by a complementary PWM control is performed. As a result, the voltage level and the frequency of the drive signal is appropriately adjusted while suppressing the occurrence of the drive sound, thereby making it possible to give a torque for surely starting the motor.

BRIEF DESCRIPTION OF THE DRAWINGS

The above and other objects, features and advantages of the present invention will become more apparent from the flowing detailed description made with reference to the accompanying drawings. In the drawings.

DETAILED DESCRIPTION OF THE PREFERRED EMBODIMENTS

First Embodiment

Figure 1:
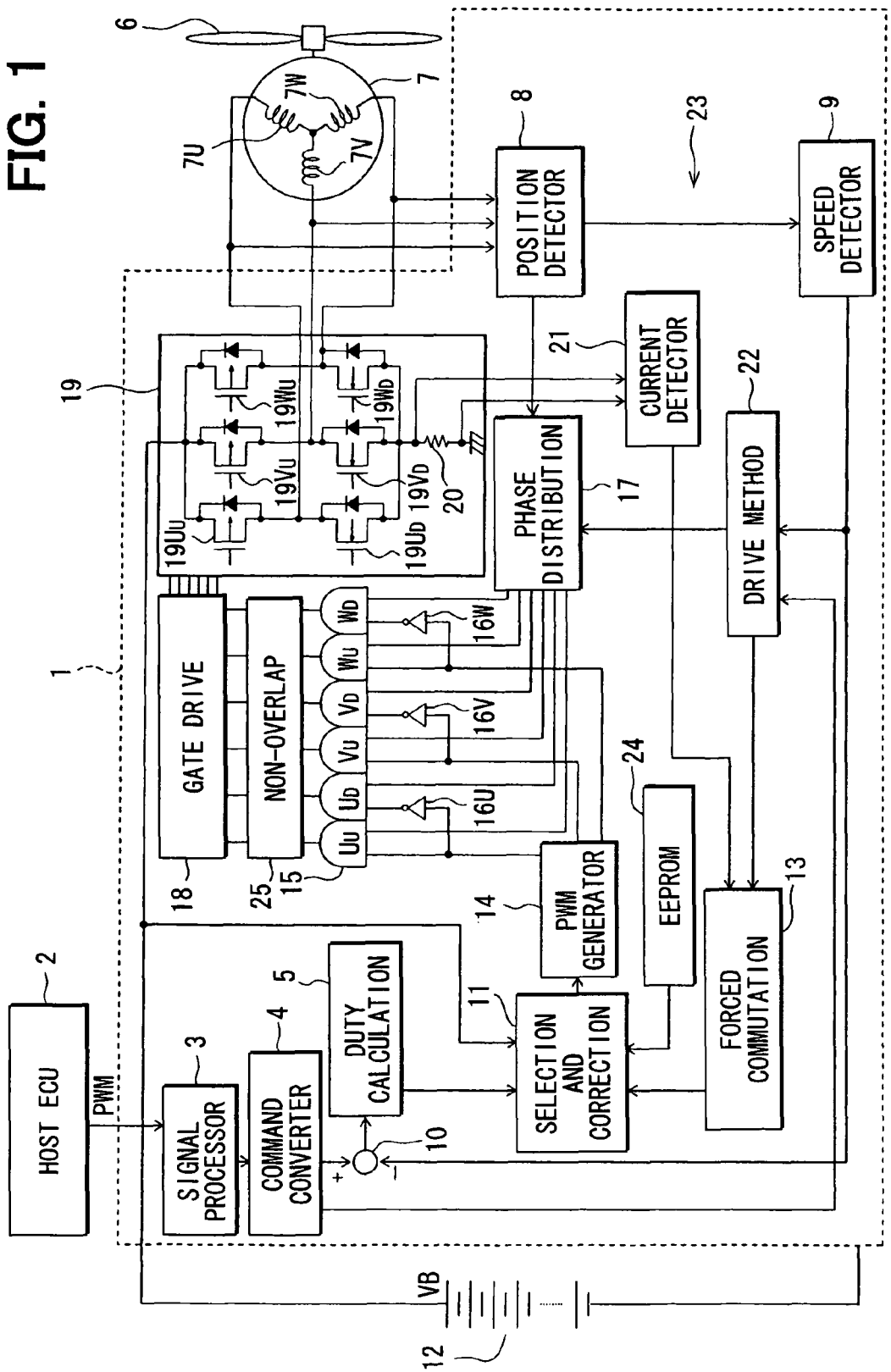
FIG. 1 is a circuit diagram showing a vehicle fan drive apparatus according to a first embodiment of the present invention.

Referring first to FIG. 1 showing a first embodiment, a motor control apparatus is configured as a fan drive apparatus 1 for driving a fan motor 7 mounted in a vehicle by energizing or exciting the fan motor 7 under a PWM control. The fan motor 7 is a three-phase brushless DC motor. Upon receiving a rotation speed command of a fan which is supplied as a PWM signal from a host control unit 2 such as a host ECU (electronic control unit), the fan drive apparatus 1 converts the PWM signal after signal processing by a signal processor circuit 3 into a voltage signal corresponding to the duty of the PWM signal, and outputs the voltage signal to a rotation speed command converter circuit 4. Upon receiving output signals from, for example, a water temperature sensor (NOt shown) that detects a water temperature within a radiator, or a vehicle speed sensor that detects the vehicle speed, the host control unit 2 outputs the rotation speed command according to those detection results.

The rotation speed command converter circuit 4 determines the rotation speed command according to the voltage signal, and outputs the rotation speed command to a duty calculation circuit 5. The fan 6 is rotationally driven by the motor 7, and the rotating state of the motor 7 is detected by the position detector circuit 8. The position detector circuit 8 detects (position sensorless system) rotation, for example, based on an induced voltage waveform that is developed in the winding of the motor 7.

The rotation speed detector circuit 9 calculates the rotation speed of the motor 7 based on a detection signal (a rotational position signal of a rotor of the motor 7) which is output by the position detector circuit 8, and outputs the rotation speed to an input side of the duty calculation circuit 5. A subtractor 10 calculates a difference between the rotation speed that is calculated by the rotation speed detector circuit 9 and the rotation speed command that is output by the rotation speed command converter circuit 4, and inputs the subtraction result to the duty calculation circuit 5.

The duty calculation circuit 5 performs, for example, PI (proportional and integral) control based on the above subtraction result to calculate a duty command, and outputs the duty command to a duty command selection/voltage correction circuit 11. The duty command selection/voltage correction circuit 11 corrects the duty command that is supplied from the duty calculation circuit 5 according to a voltage VB of a battery 12 of the vehicle, and switches over the configuration of the duty command that is output to a PWM signal generator circuit 14 according to a switch signal which is supplied from a forced commutation time duty command generator circuit 13.

Figure 3A:
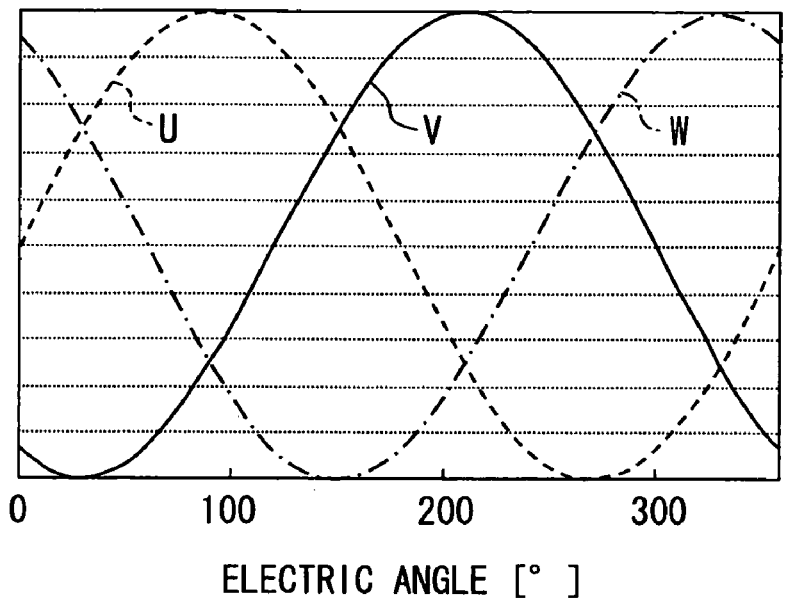
FIGS. 3A and 3B are signal diagrams showing a waveform of a start drive signal.

That is, upon receiving the switch signal for outputting the duty command corresponding to the forced commutation time from the forced commutation time duty command generator circuit 13, the duty command select/voltage correction circuit (hereinafter referred to simply as a duty command selection circuit) 11 outputs the sinusoidal PWM duty command of three phases (different in phase by 120°, respectively) as shown in FIG. 3A. When the duty command select/voltage correction circuit 11 does not receive the switch signal, the duty command selection/voltage correction circuit 11 outputs the duty command that is supplied from the duty calculation circuit 5 as it is. The duty command selection circuit 11 reads data required for control from an EEPROM 24 (memory means) as the occasion demands.

The PWM signal generator circuit 14 compares the corrected duty command that is supplied from the duty command selection circuit 11 with a carrier of the PWM control which is internally generated in amplitude to generate the PWM signal, and outputs the PWM signal to the input terminals of six AND gates 15 ($U_U$, $U_D$, $V_U$, $V_D$, $W_U$, $W_D$). The U-phase signal is output to the AND gate 15$U_U$ and the AND gate 15$U_D$ through a NOT gate 16U. The V-phase signal is output to the AND gate 15$V_U$ and the AND gate 15$V_D$ through a NOT gate 16V. The W-phase signal is output to the AND gate 15$W_U$ and the AND gate 15$W_D$ through a NOT gate 16W, respectively.

The detection signal that is output by the position detector circuit 8 is also supplied to an energization phase distribution circuit 17. When the energization phase distribution circuit 17 generates a 120° energization pattern signal of the rectangular wave according to the rotation position of the rotor which is indicated by the detection signal, the energization phase distribution circuit 17 outputs the energization pattern signal to the remaining input terminals of the respective AND gates 15.

The AND gates 15$U_U$, 15$V_U$, and 15$W_U$ output the PWM signal that is generated by the PWM signal generator circuit 14 to a gate drive circuit 18 through a non-overlap setting section 25 as a high side signal during a period of time when the energization pattern signal that is supplied by the energization phase distribution circuit 17 is at high level. The signals that are supplied to the gate drive circuit 18 through the non-overlap setting section 25 from the AND gates 15$U_D$, 15$V_D$, and 15$W_D$ become low side signals. In this example, "H" of the signal is a signal that turns on a MOS FET (field effect transistor), and "L" is a signal that turns off the MOS FET.

An inverter circuit 19 is constructed in a three-phase bridge circuit by connecting, for example, six power MOS FETs 19$U_U$, 19$V_U$, and 19$W_U$ (which are of p-channel), and 19$U_D$, 19$V_D$, and 19$W_D$ (which are of n-channel). The gate signals that are output from the gate drive circuit 18 are supplied to the respective gates of the respective FETs 19$U_U$ to 19$W_D$ (switching elements). The respective phase output terminals of the inverter circuit 19 are connected to the respective phase winding wires 7U, 7V, and 7W of the motor 7.

The non-overlap setting section 25 is arranged to set a period (NOn-overlap period) during which both of those FETS turn off at the same time while the level of the PWM signal changes to high or low in order to prevent the penetration current from flowing by turning on the upper (high potential) arm side FETS 19$U_U$, 19$V_U$, and 19$W_U$ of the inverter circuit 19, and the lower (low potential) arm side FETs 19$U_D$, 19$V_D$, and 19$W_D$ corresponding to those upper arm side FETs at the same time. The above non-overlap setting section 25 can be integrated with logic circuits such as the AND gates 15 and the NOT gates 16. It is preferable that the non-overlap period is set to a value close to "0" as much as possible so as not to increase the distortion of the sinusoidal waveform.

A current detection shunt resistor (current detecting means) 20 is connected between the lower arm side of the inverter circuit 19 and the ground. When a terminal voltage of the shunt resistor 20 is detected by a current detector circuit (current detecting means) 21, the terminal voltage is applied to the forced commutation time duty command generator circuit 13. The shunt resistor 20 and the current detector circuit 21 are generally used for detecting an over-current which is caused by phase-out or overload. The operation when the detection current is supplied to the command generator circuit 13 will be described with reference to a second embodiment which will be described later. The operation and the circuit at the time of over-current which is caused by the phase-out and the overload will be omitted because they are known in the art.

The output signal of the rotation speed detector circuit 9 is also supplied to a drive method or mode determination circuit 22. The drive method determination circuit 22 outputs a drive method switch signal to the forced commutation time duty command generation circuit 13 and the energization phase distribution circuit 17 according to the rotation speed of the motor 7.

In the above configuration, the position detector circuit 8, the rotation speed detector circuit 9, the duty command selection circuit 11, the forced commutation time duty command generation circuit 13, and the drive method determination circuit 22 form start control section 23.

Figure 2:
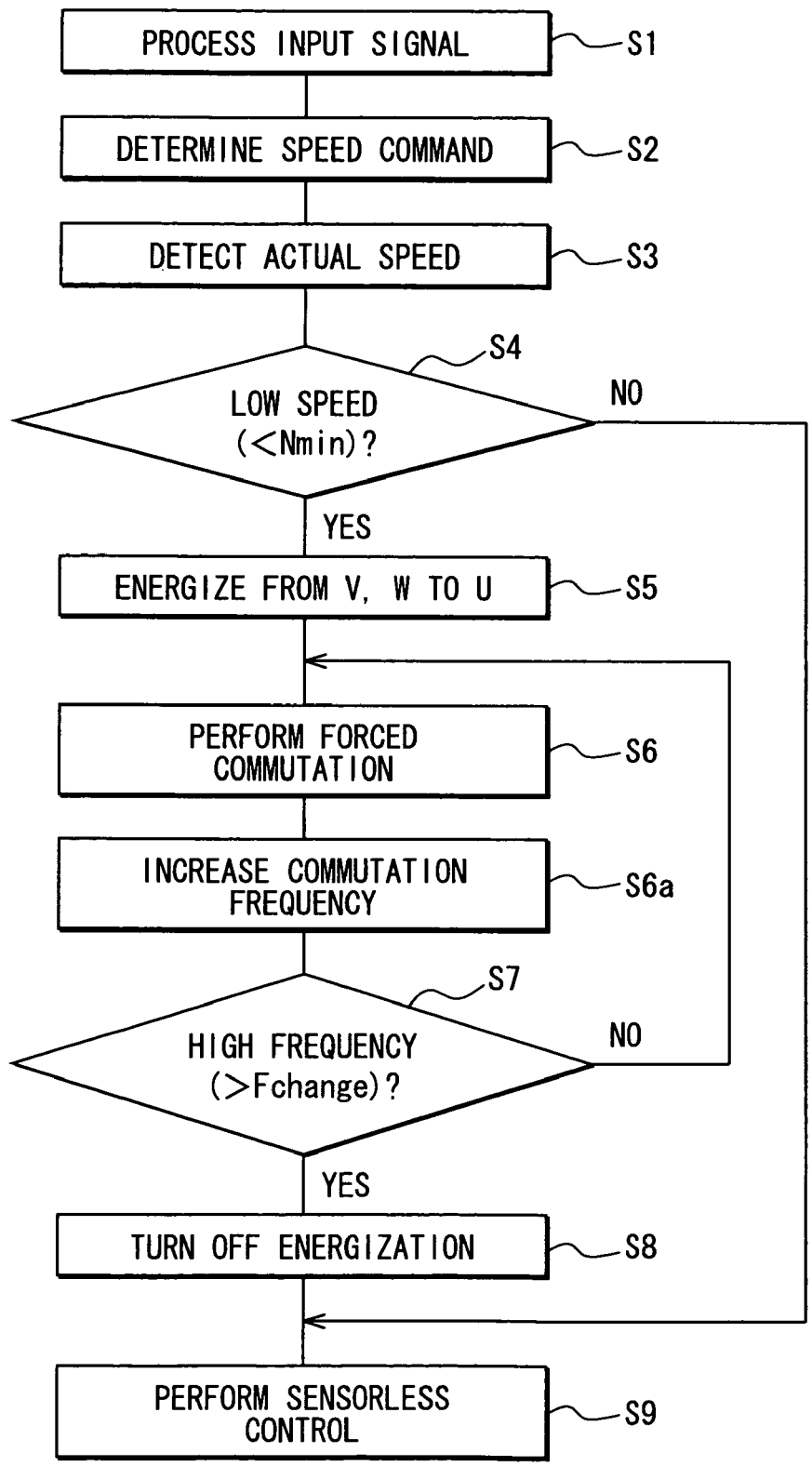
FIG. 2 is a flowchart showing a circuit operation.

Subsequently, the operation of this embodiment will be described with reference to FIGS. 2 to 4. FIG. 2 shows the circuit operation that is mainly performed by the start control section 23 of the drive apparatus 1. When the host control unit 2 outputs the rotation speed command for the fan 6, a signal processor circuit 3 outputs a voltage signal resulting from processing the command to the rotation speed command converter circuit 4 (S1). Then, the rotation speed command converter circuit 4 determines the rotation speed command according to the above voltage signal, and outputs the rotation speed command to the duty calculation circuit 5 (S2).

Subsequently, the drive method determination circuit 22 detects the actual rotation speed of the motor 7 at that time by the rotation speed detector circuit 9 (S3), and checks whether the detected rotation speed is equal to or lower than a given value Nmin (rpm) or not (S4). For example, when the motor 7 stops or the motor 7 is not driven by the drive apparatus 1 but rotates at low speeds while the fan 6 receives wind due to vehicle travel (YES), for example, a DC energization is performed from the V and W-phases of the upper arm in the inverter circuit 19 to the U-phase of the lower arm to position the rotor of the motor 7 (S5).

In this situation, the drive method determination circuit 22 renders the switch signal of the drive method active, and the energization distribution circuit 17 outputs a high level signal to only the AND gates 15$U_D$, 15$V_U$ and 15$W_U$ for a given period of time since a time point when the switch signal is rendered active. Upon receiving the switch signal through the forced commutation time duty command generation circuit 13, the duty command selection circuit 11 outputs the PWM duty command with a given duty for a given period of time (for example, 10%). The duty can be appropriately so set as to generate a torque which allows the rotor to be positioned.

After the rotor is positioned in S5, the forced commutation time duty command generation circuit 13 outputs the duty command for supplying a sinusoidal drive signal (three phases) shown in FIG. 3A to the motor 7 to the duty command selection circuit 11. Then, the duty command selection circuit 11 selects the duty command that is supplied from the forced commutation time duty command generation circuit 13, and outputs the selected duty command to the PWM signal generation circuit 14 to start the motor 7 by the forced commutation (S6).

In this case, the energization phase distribution circuit 17 outputs the high level signal to all of the AND gates 15, and switches over the on/off operation of the upper arm and the lower arm of the inverter circuit 19 by only the PWM signal that is output by the PWM signal generation circuit 14. As a result, the control configuration of PWM becomes a complementary three-phase modulation, and in the drive signal waveform at the time of forced commutation, the average voltage becomes a sinusoidal PWM waveform shown in FIG. 4.

Figure 3B:
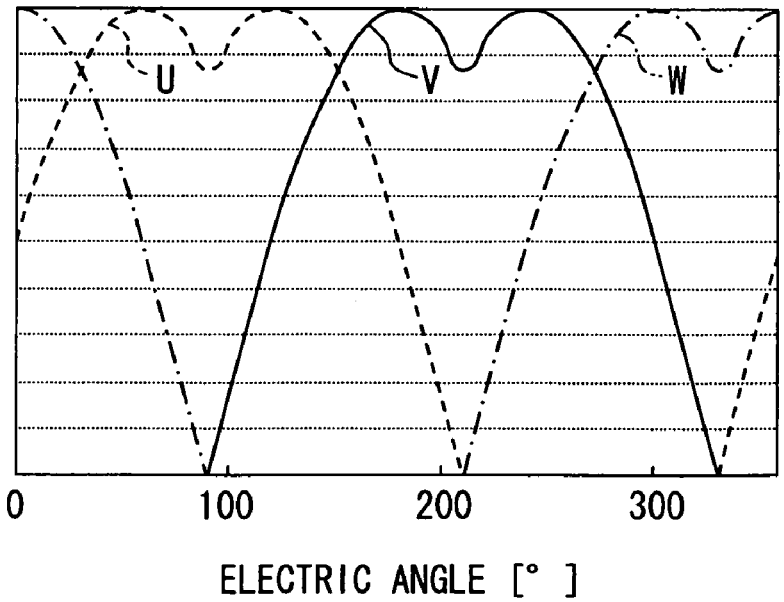
Figure 4:
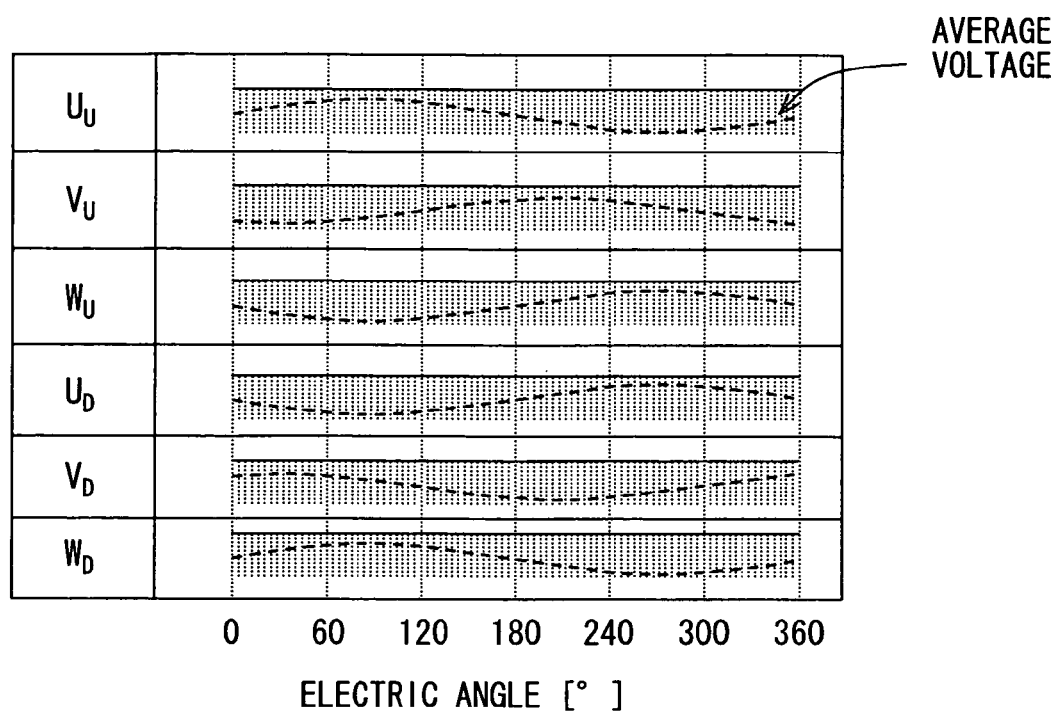
FIG. 4 is a signal diagram showing that an average voltage of a start drive signal is sinusoidally formed according to a PWM control.

Alternatively, it is possible that the drive signal waveform is replaced with a sinusoidal wave shown in FIG. 3A so that the same sinusoidal signal is supplied by the two-phase modulation method as shown in FIG. 3B. That is, while any one of three phases is kept without being subjected to the switch operation (the upper arm is off, and the lower arm is on), the switching operation is performed by the remaining two phases under the complementary PWM control.

While the forced commutation is being conducted in S6, the frequency of the forced commutation gradually increases (S6a). It is checked whether the frequency is equal to or higher than a given value Fchange [Hz] or not (S7). Then, when the forced commutation frequency of the motor 7 is equal to or higher than the given value Fchange [Hz] (YES), the drive method determination circuit 22 renders the drive method switch signal inactive. As a result, the energization phase distribution circuit 17 outputs a low-level signal to all of the AND gates 15 for a given period of time, turns off the energization that is performed by the inverter circuit 19, and makes the motor 6 in a free run state (S8). In this example, a period of time when the energization is off is set to be 360° or more as the electric angle.

After the above energization-off period has elapsed, the rotation speed of the motor 7 increases to some degree at this stage. As a result, the position detector circuit 8 is capable of sufficiently detecting the rotor position based on the zero-cross point of the induced voltage that is developed in the winding wires 7U to 7W of the motor 7. Accordingly, the duty command selection circuit 11 performs the switching operation so as to output the PWM duty command for supplying the rectangular waveform drive signal, and the energization phase distribution circuit 17 starts the three-phase distribution signal output, and shifts to the sensorless control (S9).

In the subsequent operation, the determination of "no" is performed in S4 to shift the processing to S9, and the motor 7 receives the rectangular waveform drive signal by the sensorless control system.

The given value Fchange is set to such a frequency that the amplitude of the induced voltage that is developed in the winding wires 7U to 7W of the motor 7 reaches a level that can be positionally estimated by the sensorless control in S7.

In addition to that condition, the drive noise of the fan 6 due to the motor 7 can be set to a frequency that is equal to or higher than the drive noise of the motor 7 under the sensorless control of the rectangular wave. When the setting is performed as in the latter, in a region where the noise of the fan 6 is small in the low rotation region, the drive noise of only the motor 7 due to the rectangular wave when switching over to the sensorless control is masked by the drive noise of the fan 6, and cannot be heard as an abnormal noise.

As described above, according to this embodiment, the start control section 23 of the drive apparatus 1 receives the start command from the host control unit 2 when the motor 7 that rotates the vehicle fan 6 is in the stop state or the low-speed rotating state where the sensorless control cannot be applied. Then, the start control section 23 starts the motor 7 by the forced commutation that applies the pseudo sinusoidal drive signal under the complementary PWM control, and thereafter changes over from the complementary PWM control to the sensorless control.

That is, because the wind roar occurs in a state where the vehicle fan 6 is steadily driven, the drive sound is masked out of a vehicle passenger by applying the rectangular waveform drive voltage to the motor 7 without any problem, even if the drive sound occurs. However, when the motor 7 starts from the state where the rotation stops or the low-speed rotating state, it is difficult to mask the drive sound, thereby resulting in the drive sound. Also, there is the necessity of supplying the torque for surely starting the motor 7.

Accordingly, when the motor 7 starts, the sinusoidal drive signal is supplied to perform the forced commutation. This makes it possible to appropriately adjust the voltage level and the frequency of the drive signal so as to supply a torque for surely starting the motor 7 while the motor 7 smoothly starts to suppress the generation of the drive noise. In that case, as shown in FIG. 3B, when the pseudo sinusoidal start drive signal is supplied to the motor 7 in the two-phase modulation method, the number of times of switching the respective FETs in the inverter circuit 19 under the PWM control can be reduced in total, the drive current of the gate drive circuit 18 can be reduced, and the switching loss (heating of the respective FETs) can be suppressed.

Also, the start control section 23 switches over to the sensorless control after turning off the energization to the motor 7 for a given period of time, for example, by the electric angle 360° or more at the rotation speed when the switching is performed, after conducting the forced commutation. As a result, the interval when the drive system switches over can be sufficiently ensured to smooth the switching. Further, since the forced commutation starts after the rotor of the motor is positioned by the DC energization 7, it is possible to smoothly start the motor 7 from a state where the rotor is positioned.

Further, the given value Fchange in S7 is set to such a frequency that the amplitude of the induced voltage that is developed in the winding wires 7U to 7W of the motor 7 reaches a level which can be positionally estimated under the sensorless control. As a result, it is possible to surely and smoothly shift to the sensorless control. In addition to the above condition, the given frequency Fchange is set to such a frequency that the drive noise of the fan 6 due to the motor 7 becomes equal to or higher than the drive noise due to the rectangular wave. As a result, in a region where the noise of the fan 6 is small in the low rotation region, the drive noise of only the motor 7 due to the rectangular wave when switching over to the sensorless control is masked, thereby making it possible to reduce the uncomfortable feeling that vehicle passengers have.

Second Embodiment

Figure 5:
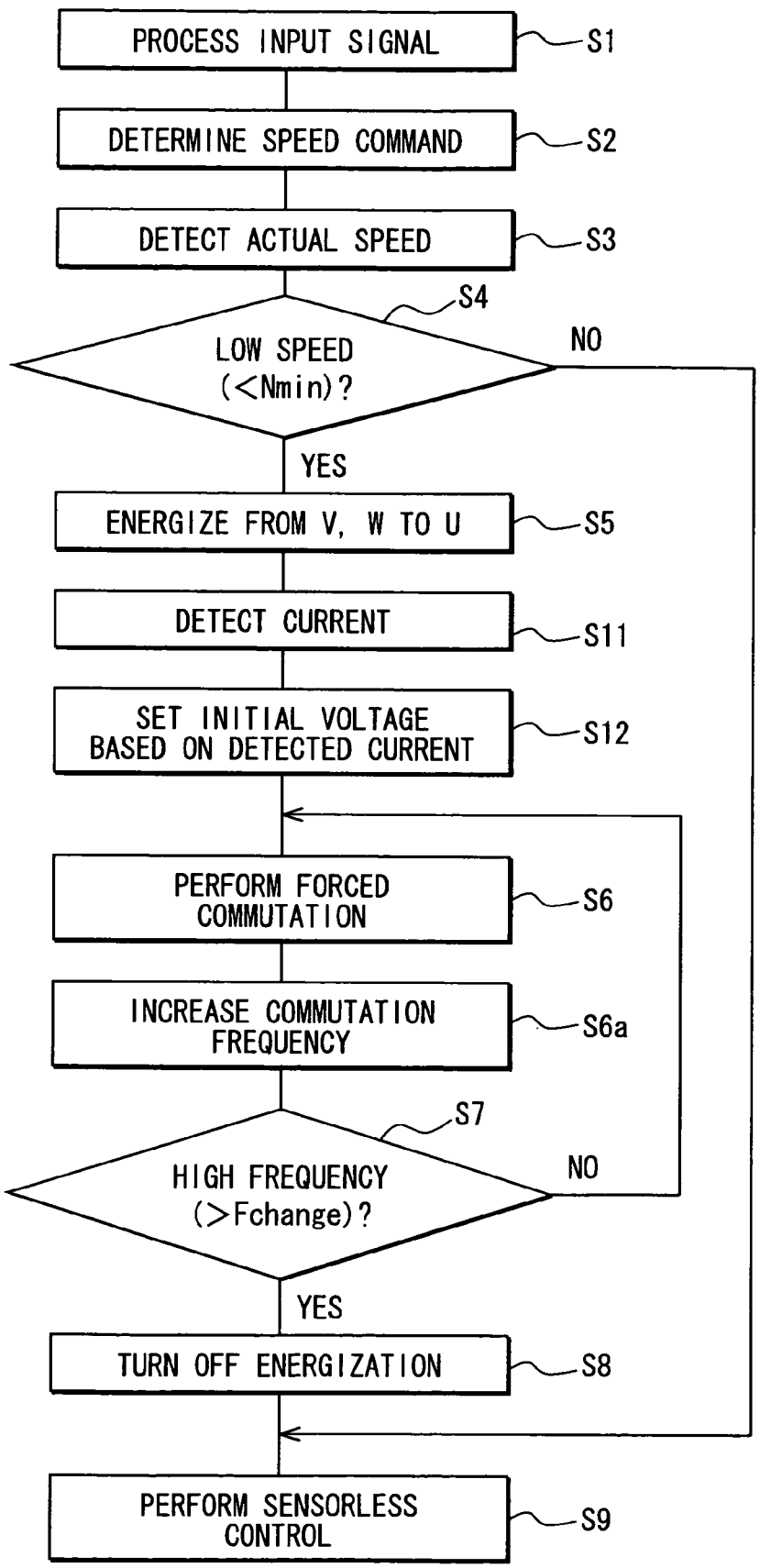
FIG. 5 is a flowchart showing a circuit operation according to a second embodiment of the present invention.
Figure 6:
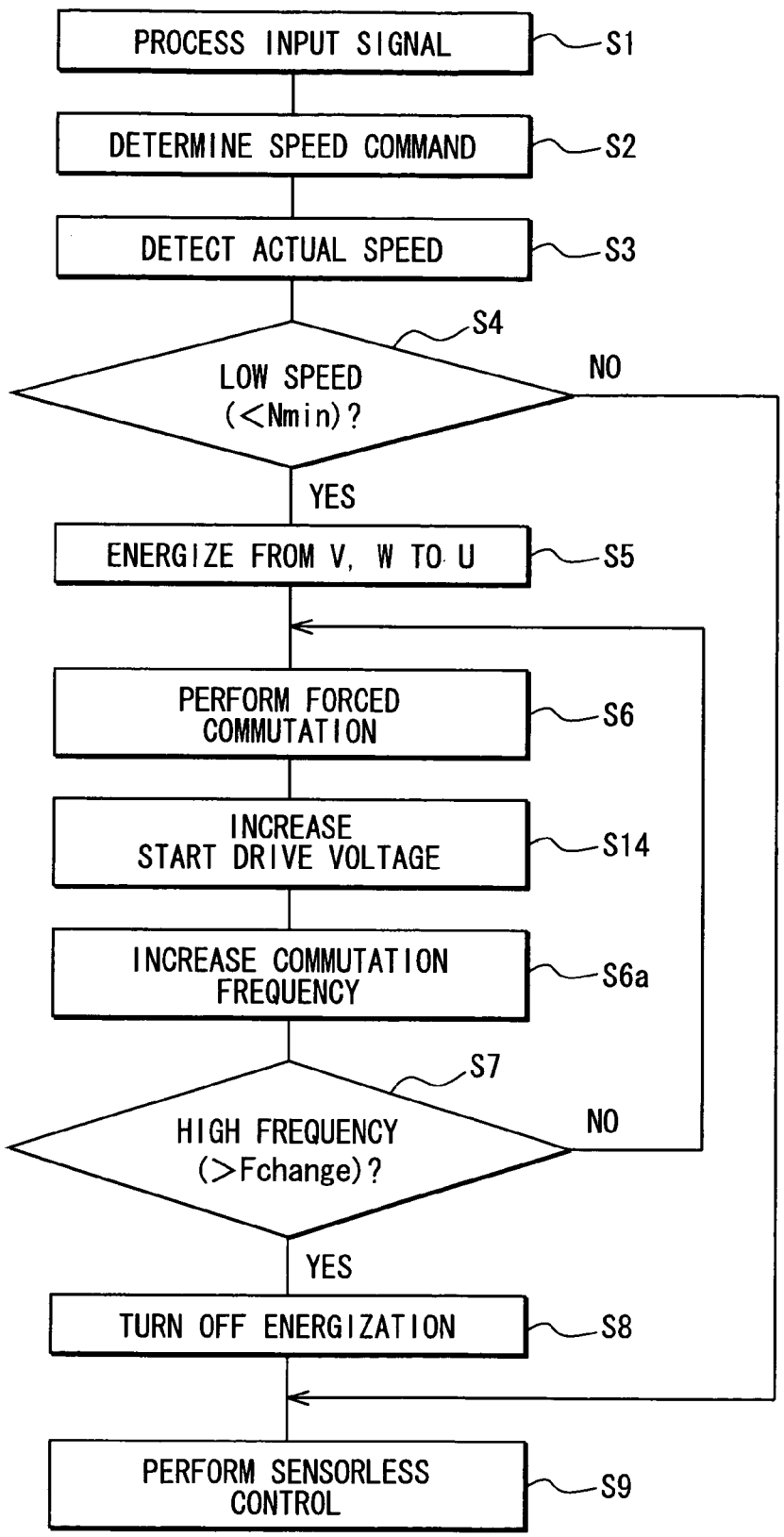
FIG. 6 is a flowchart showing a circuit operation according to a third embodiment of the present invention.
Figure 7:
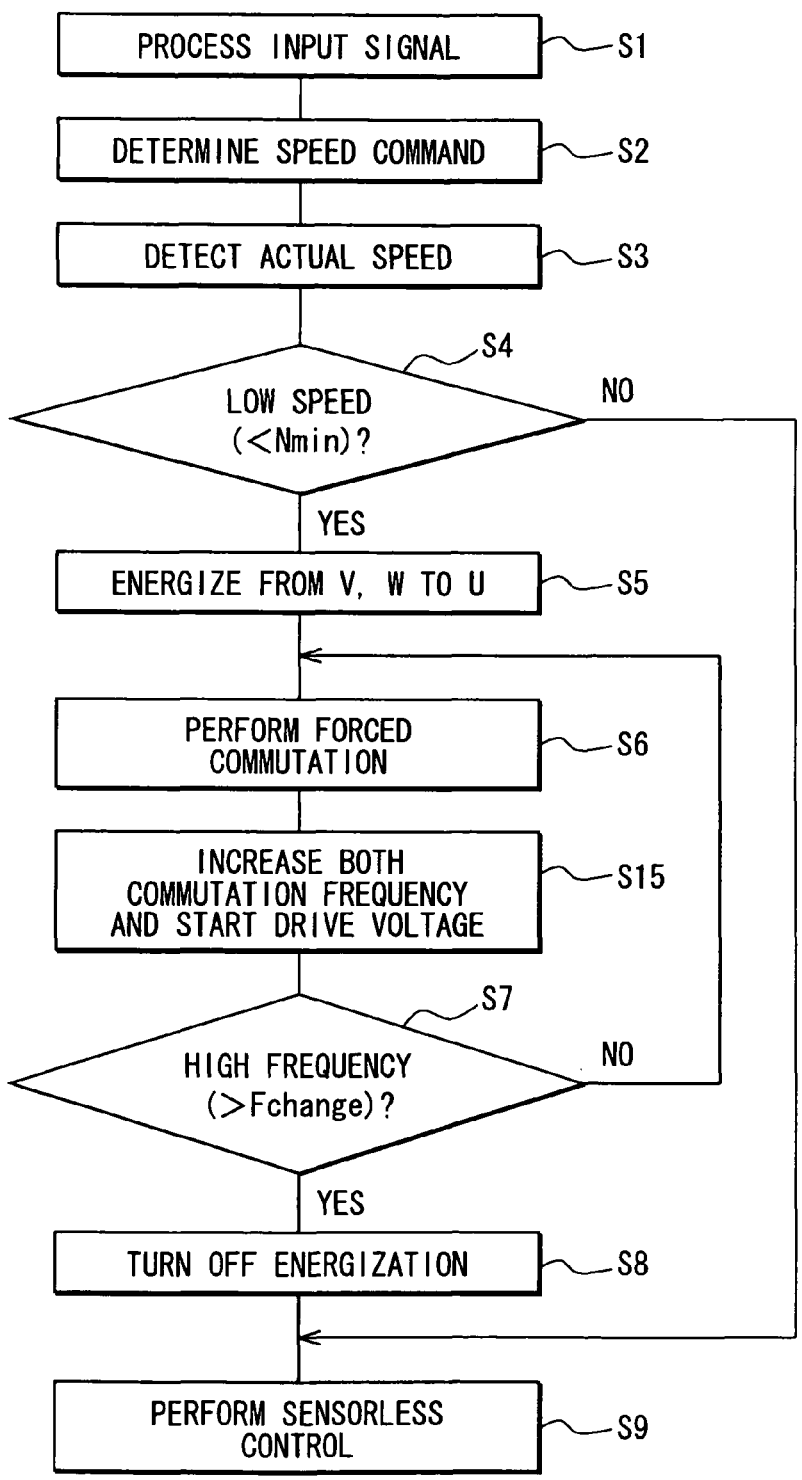
FIG. 7 is a flowchart showing a circuit operation according to a fourth embodiment of the present invention.
Figure 8:
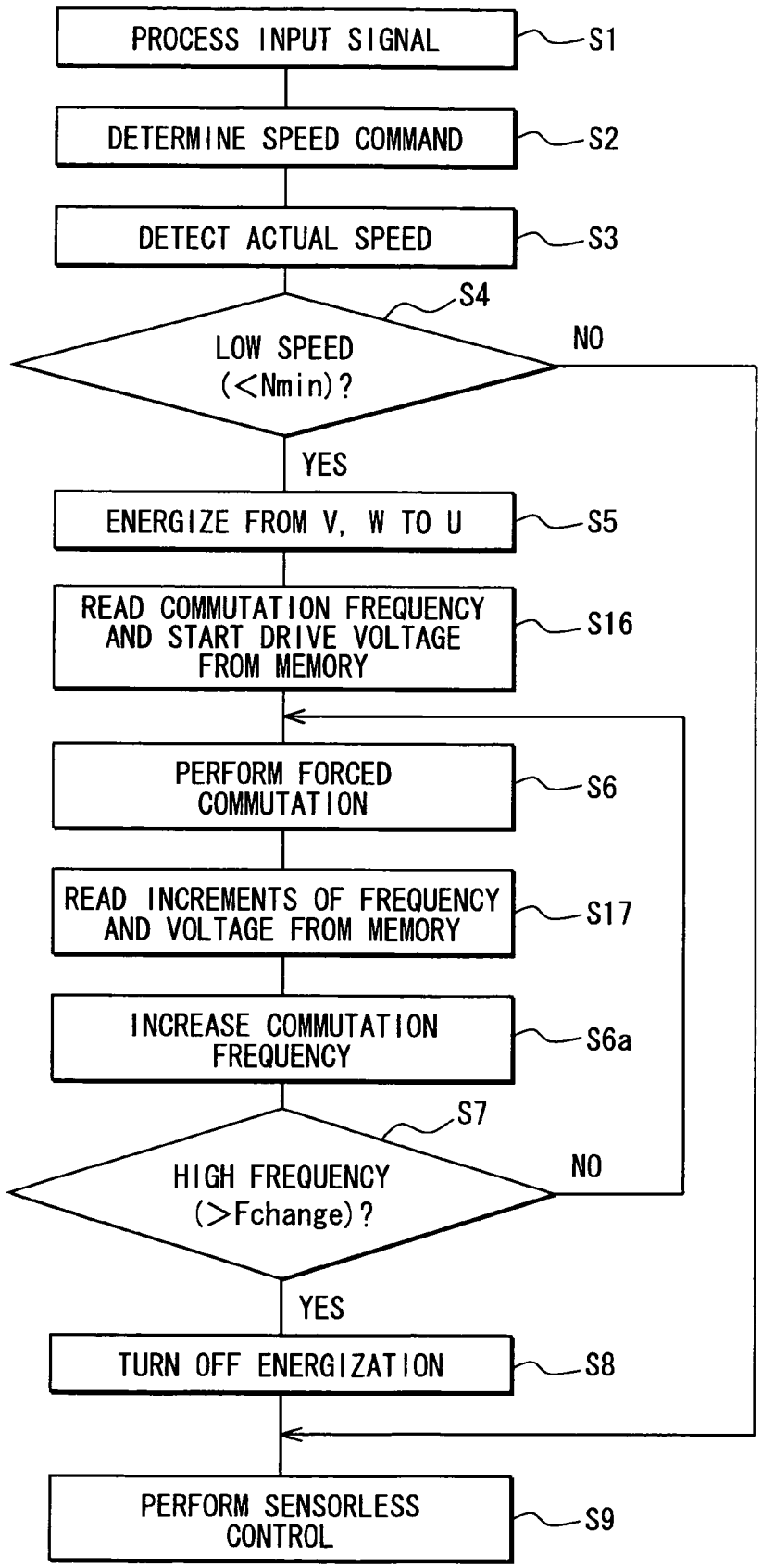
FIG. 8 is a flowchart showing a circuit operation according to a fifth embodiment of the present invention.

The second embodiment may be configured in the similar manner as the first embodiment. In this embodiment, however, the current detector circuit 21 is used additionally in comparison to the first embodiment. As shown in FIG. 5 corresponding to FIG. 2, when the rotor is positioned with the DC energization in S5, the duty command selection circuit 11 detects an actual current value that flows in the shunt resistor 20 in this situation through the current detector circuit 21 (S11). Then, the voltage amplitude (maximum) of the pseudo sinusoidal wave which is a start drive signal is variably set according to the amplitude of the current value.

That is, since the resistance of the winding wires of the motor 7 changes according to the ambient temperature, the current reflects the winding resistance at that time according to the voltage that is applied to the winding wires at the time of positioning. Accordingly, when the voltage amplitude of the start drive signal is set according to the current, the substantially same current is allowed to flow in the winding wires 7U to 7W of the motor 7 even if the ambient temperature is different, thereby making it possible to perform stable starting.

Third Embodiment

The third embodiment may be configured in the similar manner as the first embodiment. In the third embodiment, however, the voltage of the start drive signal is gradually increased (S14). That is, the maximum of the amplitude that changes in the sinusoidal configuration increases every time S14 is executed. For example, the maximum is increased by each 1% of the upper limit until reaching the upper limit of the applied voltage. With the above configuration, it is possible to start the motor more smoothly and surely.

Fourth Embodiment

The fourth embodiment may be configured in the similar manner as the first embodiment. In the fourth embodiment, however, both the commutation frequency and the voltage of the start drive signal are sequentially increased in S15. For example, when the forced commutation is performed while the frequency increases at the ratio of 0.05 Hz/ms to 2.5 Hz to 25 Hz, the duty increases from 15% at the ratio of 0.36%/Hz. As a result, it is possible to start the motor more smoothly and surely.

Fifth Embodiment

The fifth embodiment may be configured in the similar manner as the first embodiment. In the fifth embodiment, however, both of the commutation frequency and the voltage (parameter) of the start drive signal are increased sequentially as in the fourth embodiment, and the respective initial values and increments are stored in the EEPROM 24 as data. Then, when S5 is executed, the duty command selection circuit 11 reads the commutation frequency and the initial value of the applied voltage which are stored in the EEPROM 24 (for example, the frequency is 2.5 Hz (30 rpm in the case of a 10-pole motor), the voltage is duty 15%), and sets the read values (S16), and starts the forced commutation of S6.

Similarly, during the period when the forced commutation is performed in S6 and S7, the duty command selection circuit 11 reads the commutation frequency and the increment of the applied voltage which are stored in the memory (for example, the frequency is 0.05 Hz/ms, the voltage is duty 0.36%/Hz), and sets the read values (S17), and sequentially increases the frequency and the voltage according to the increment. Accordingly, the duty command selection circuit 11 is capable of determining how the drive signal that is applied according to the initial values and the increments which are stored in the memory changes according to the characteristic of the motor to be used.

Sixth to Eighth Embodiments

The sixth to eighth embodiments may be configured in the similar manner as the first embodiment. FIGS. 9 to 12 show operation of the sixth to eighth embodiments. In the sixth to eighth embodiments, the start drive signal waveforms that are applied when the motor 7 is forcedly commutated are differentiated.

Figure 9:
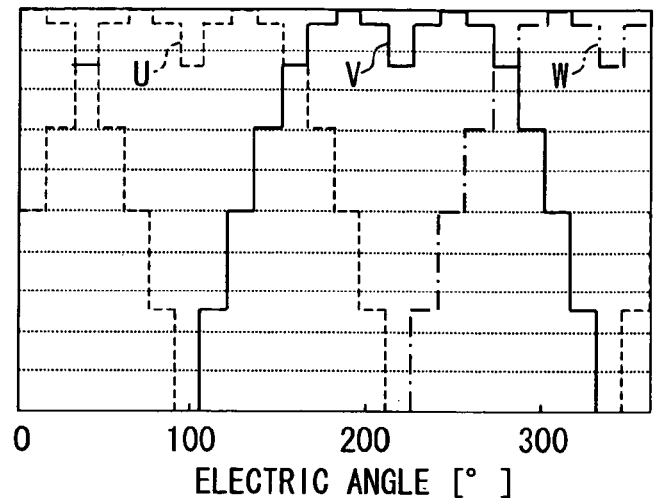
FIG. 9 is a signal diagram corresponding to FIGS. 3A and 3B according to a sixth embodiment of the present invention.
Figure 10A:
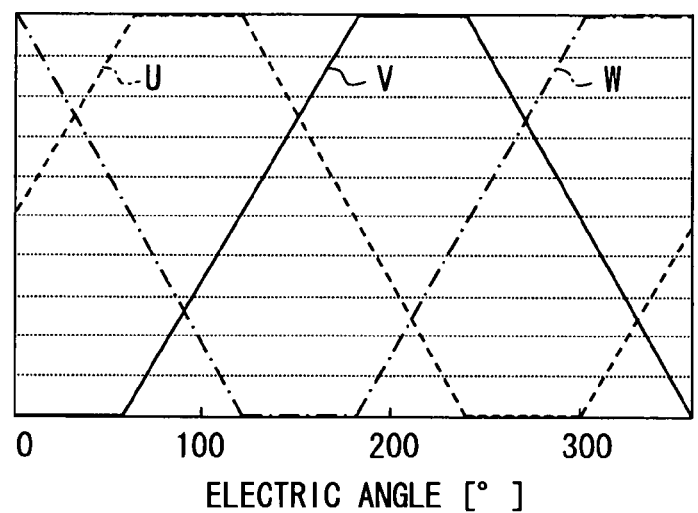
FIGS. 10A and 10B are signal diagrams corresponding to FIGS. 3A and 3B according to a seventh embodiment of the present invention.
Figure 10B:
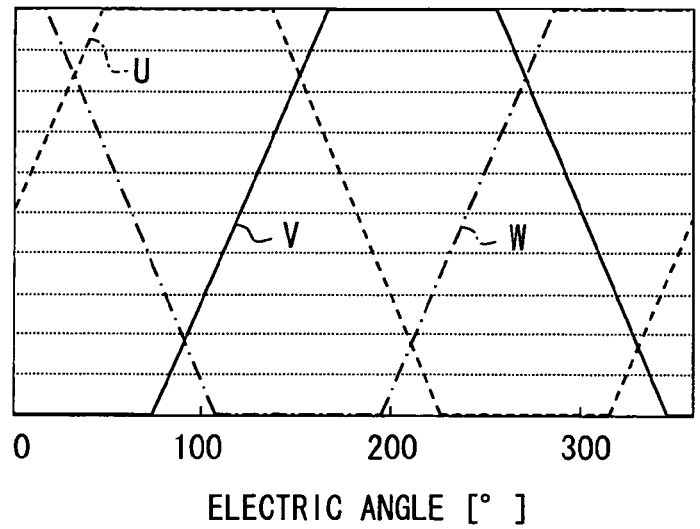
Figure 11:
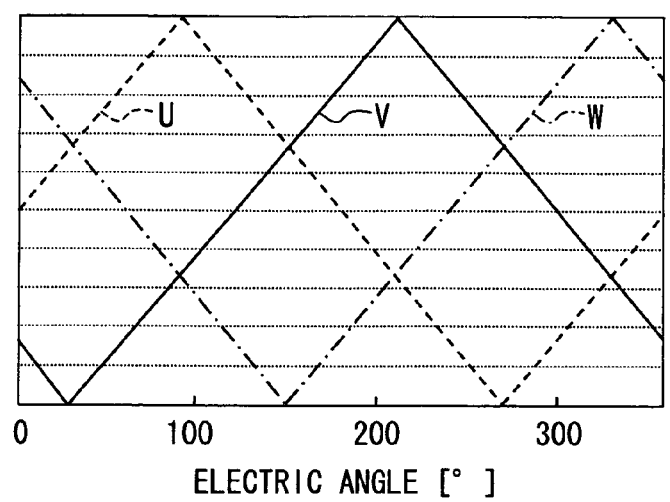
FIG. 11 is a signal diagram corresponding to FIGS. 3A and 3B according to an eighth embodiment of the present invention.

In the sixth embodiment, as shown in FIG. 9 in comparison to the first embodiment shown in FIG. 3B, the resolution of the pseudo sinusoidal wave by the same two-phase modulation method is lowered and the energization angle is changed in steps at each 15° electric angle. In the seventh embodiment, as shown in FIGS. 10A and 10B, the voltage waveform is in a trapezoid waveform. The voltage change rate is made different between FIGS. 10A and 10B. In the eighth embodiment, as shown in FIG. 11, the voltage waveform is in a triangular waveform. Even when the waveform of the start drive signal is thus shaped, a change in the applied voltage is slightly gentle as compared with the rectangular wave. As a result, it is possible to smoothly start the motor 7.

Figure 12:
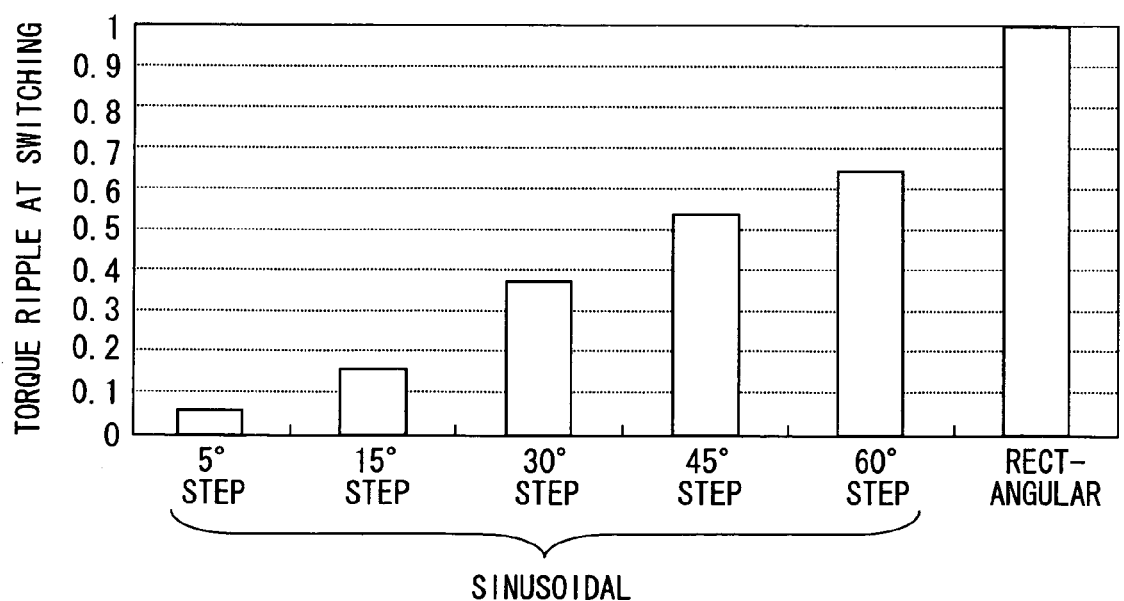
FIG. 12 is a graph showing a comparison of torque ripples between a case in which the resolution of a pseudo sinusoidal wave changes and a case in which the motor is driven by the rectangular wave.

FIG. 12 shows a comparison of the torque ripple between a case in which the resolution of the pseudo sinusoidal wave changes and a case in which the motor is driven by the rectangular wave. The torque ripple when the energization angle is 30° step is lower than ½ of the torque ripple in the case of the rectangular wave. The torque ripple is reduced more as the resolution of the pseudo sinusoidal wave improves more, according to which the circuit scale increases. Accordingly, the tradeoff of those cases can be so set as to be balanced at an appropriate point according to the individual designs.

Ninth Embodiment

Figure 13:
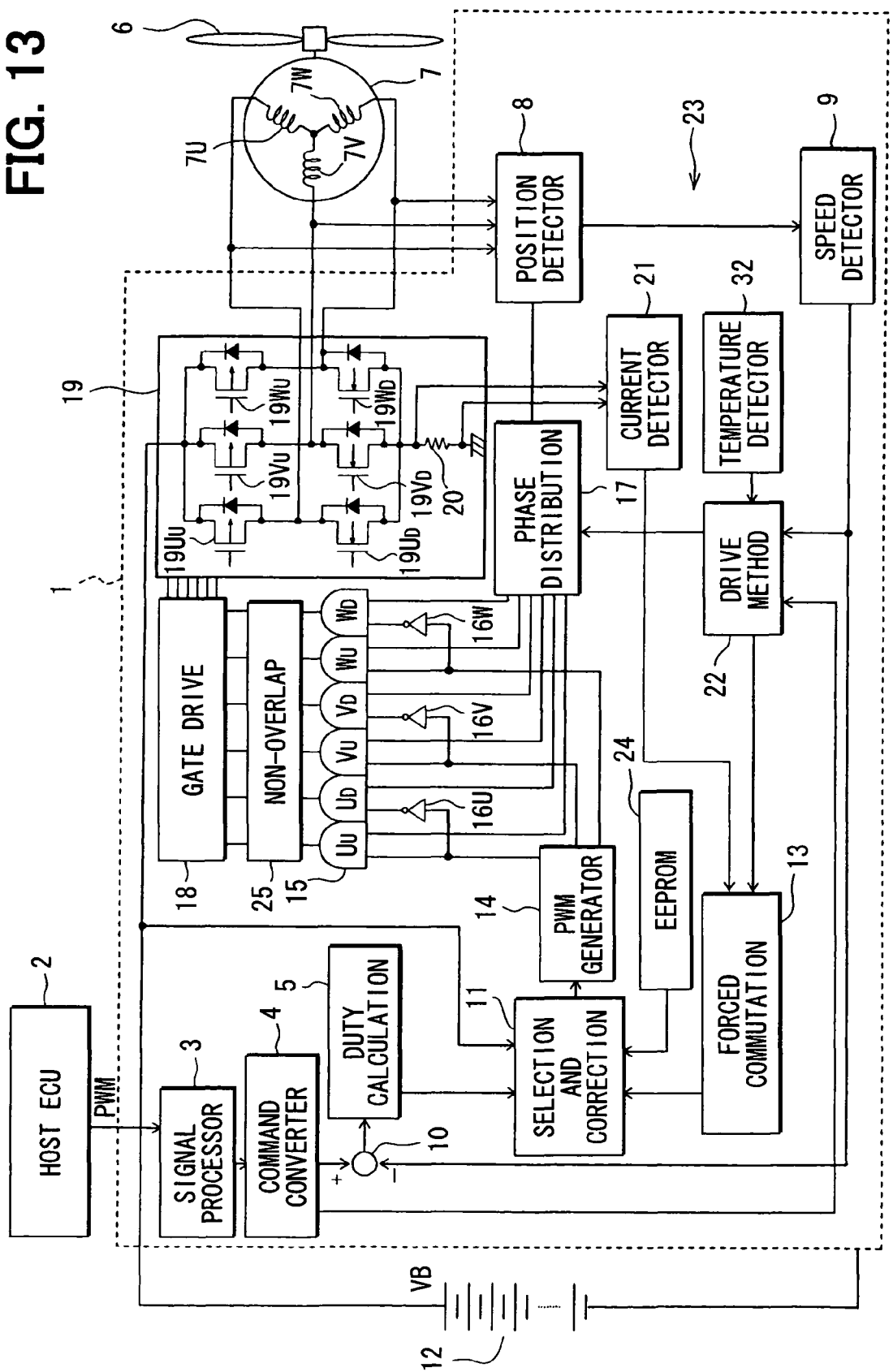
FIG. 13 is a circuit diagram corresponding to FIG. 1 according to a ninth embodiment of the present invention.

In the ninth embodiment, as shown in FIG. 13, the drive apparatus 1 includes a temperature detector circuit (temperature detecting means) 32 for detecting the temperature of the circuit interior. The detection output of the temperature detector circuit 32 is supplied to the drive method determination circuit 22. The drive method determination circuit 22 refers to the detection output of the temperature detector circuit 32 when the rotation speed of the motor 7 is equal to or lower than the given value Nmin [rpm]. The drive method determination circuit 22 then outputs an instruction for selecting the drive signal waveform that is used at the time of forced commutation according to the detection result to the forced commutation time duty command generation circuit 13 and the energization phase distribution circuit 13. The start control section 23 of the second embodiment thus has the drive method determination circuit 22 and the forced commutation time duty command generation circuit 13.

Figure 14:
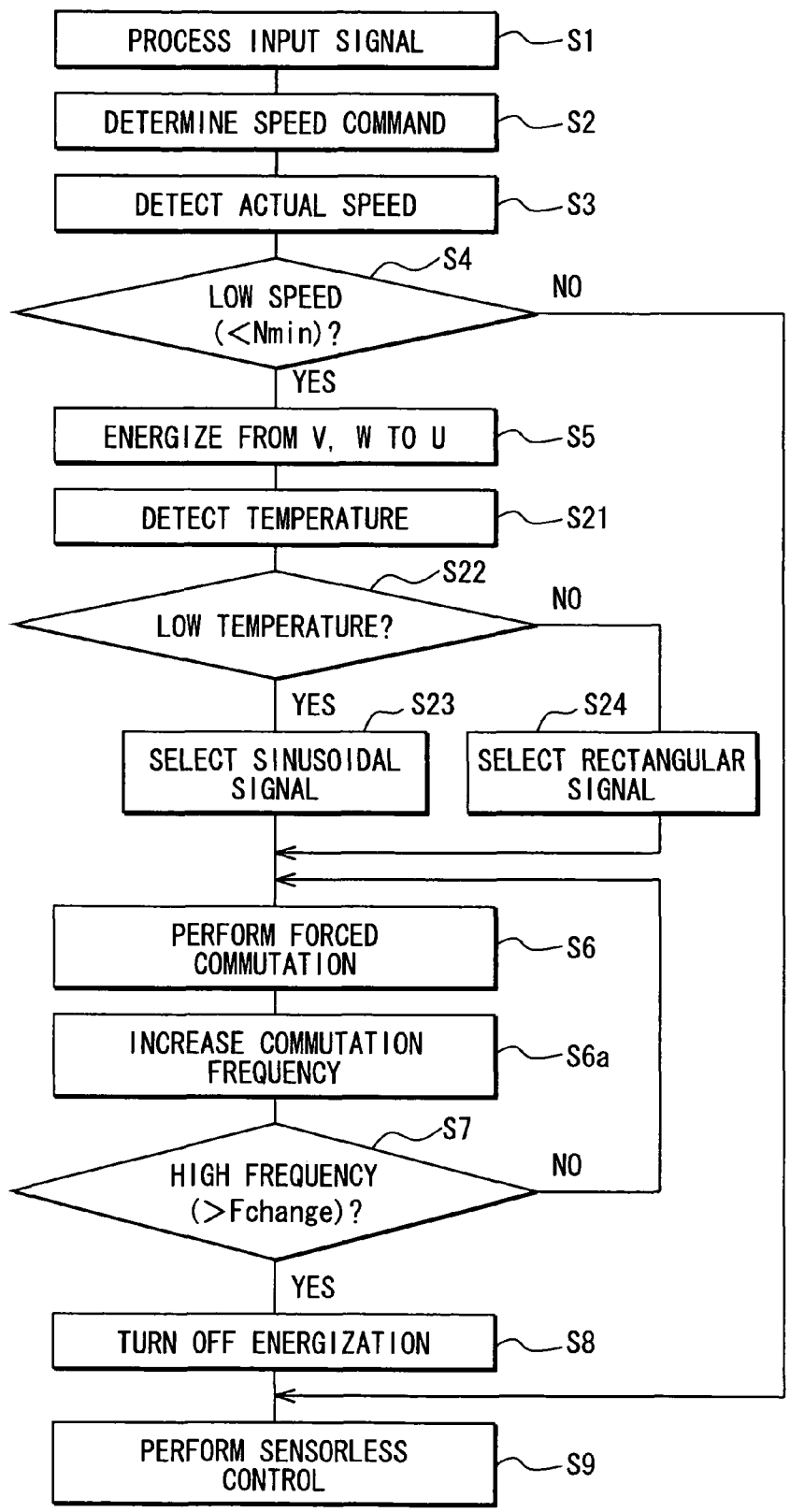
FIG. 14 is a flowchart showing a circuit operation according to the ninth embodiment.

The ninth embodiment operates as shown in FIG. 14. When the forced commutation is performed in S5, the drive method determination circuit 22 checks whether the temperature that has been detected by the temperature detector circuit 32 is lower than a given temperature or not (S21 and S22). The determination in S22 can be executed by, for example, providing a temperature determination comparator on the temperature detector circuit 32 side, and referring to the signal output state of the comparator.

Then, when the detection temperature is equal to or lower than the given temperature (YES in S22), the forced commutation time duty command generation circuit 13 and the energization phase distribution circuit 17 select the sinusoidal drive waveform for starting as in the first embodiment (S23), and the forced commutation is performed by using the selected waveform.

On the other hand, when the detected temperature exceeds the given temperature (NO in S22), the forced commutation time duty command generation circuit 13 and the energization phase distribution circuit 17 select the rectangular waveform drive signal for starting (S24), and the forced commutation is performed in S6 by using the selected rectangular waveform. In this case, the energization phase distribution circuit 17 outputs the signal of the same distribution pattern at a given frequency with the same three-phase energization distribution signal as that at the time of the sensorless control not depending on the signal output of the position detector circuit 8. As a result, at the time of the forced commutation, one-sided PWM control that switches over only the upper arm side of the inverter circuit 19 is performed.

In this case, it is preferable that the given temperature is set so that the result of executing the PWM control keeps the temperature of the inverter circuit 19 within the rated range of the circuit. With the above setting, the heat generated as a result of switching over the inverter circuit 19 makes it possible to more surely prevent the switching element from being broken down or the reliability from being deteriorated.

As described above, according to the ninth embodiment, upon receiving the start command, the start control section 23 of the drive apparatus 1 supplies the sinusoidal drive signal when the temperature that has been detected by the temperature detector circuit 32 is equal to or lower than the given value, and supplies the rectangular drive signal caused by the one-sided PWM control when the temperature exceeds the given value, thus starting the motor 7.

That is, when the temperature of the circuit periphery is low, it is desirable to supply the sinusoidal drive signal to start the motor 7 with a low noise. However, when the temperature of the circuit periphery is high, in order to suppress the further temperature rise, it is suitable to start the motor 7 while suppressing the heating which is caused by the switching loss in the PWM control. Accordingly, it is possible to appropriately switch over the starting system of the motor 7 according to the temperature that has been detected by the temperature detector circuit 32.

Tenth Embodiment

Figure 15:
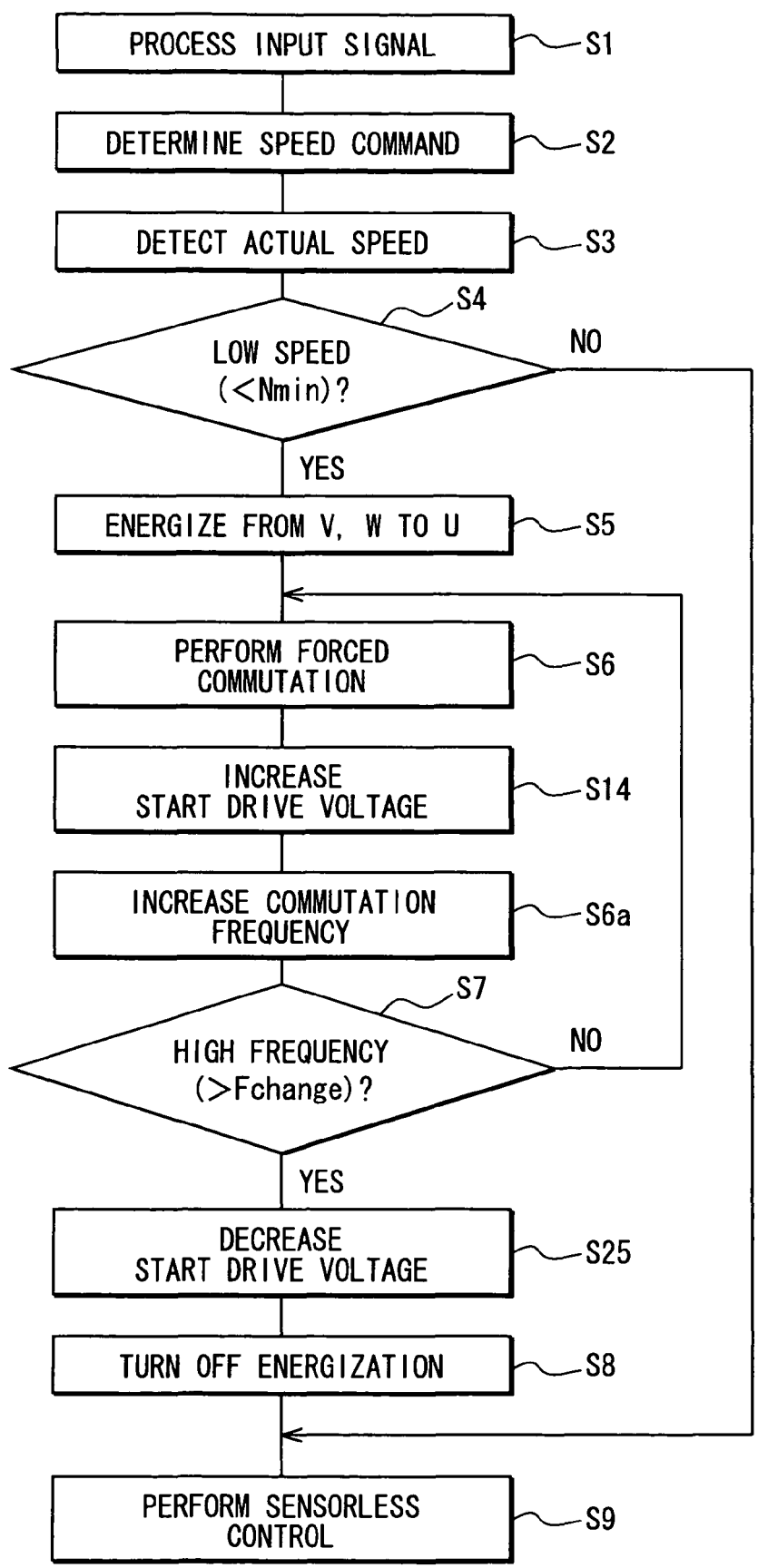
FIG. 15 is a flowchart showing a circuit operation according to a tenth embodiment of the present invention.

The tenth embodiment may be configured in the similar manner as the first embodiment. In the tenth embodiment, as shown in FIG. 15, the applied voltage is increased at S14 as in the third embodiment. Further, after S7 has been executed, the applied voltage is decreased in S25 before the energization performed by the inverter circuit 19 is turned off in S8.

Figure 16A:
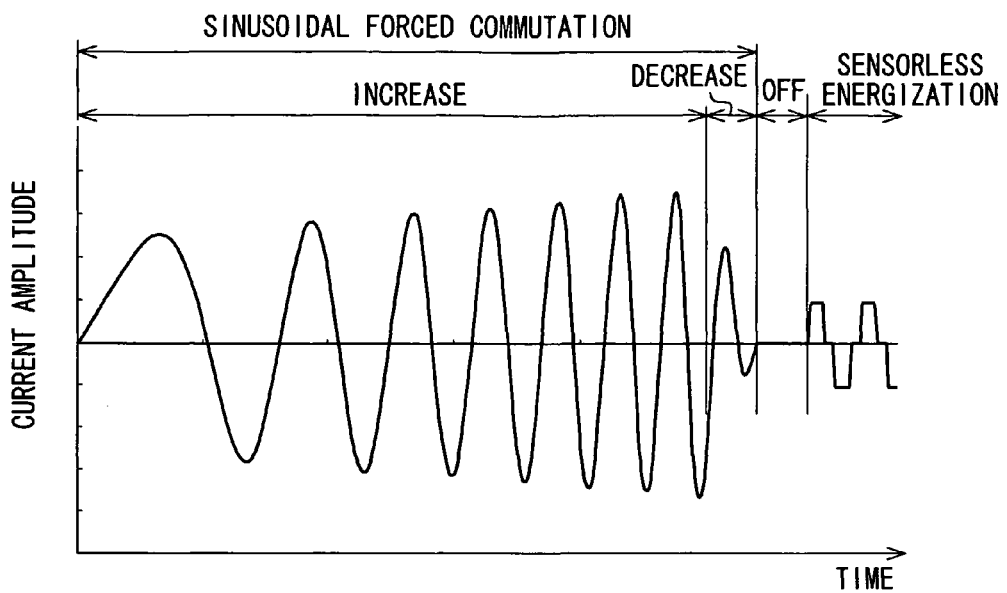
FIGS. 16A and 16B are signal diagrams showing a change in the energization current waveform in the tenth embodiment and the third embodiment.
Figure 16B:
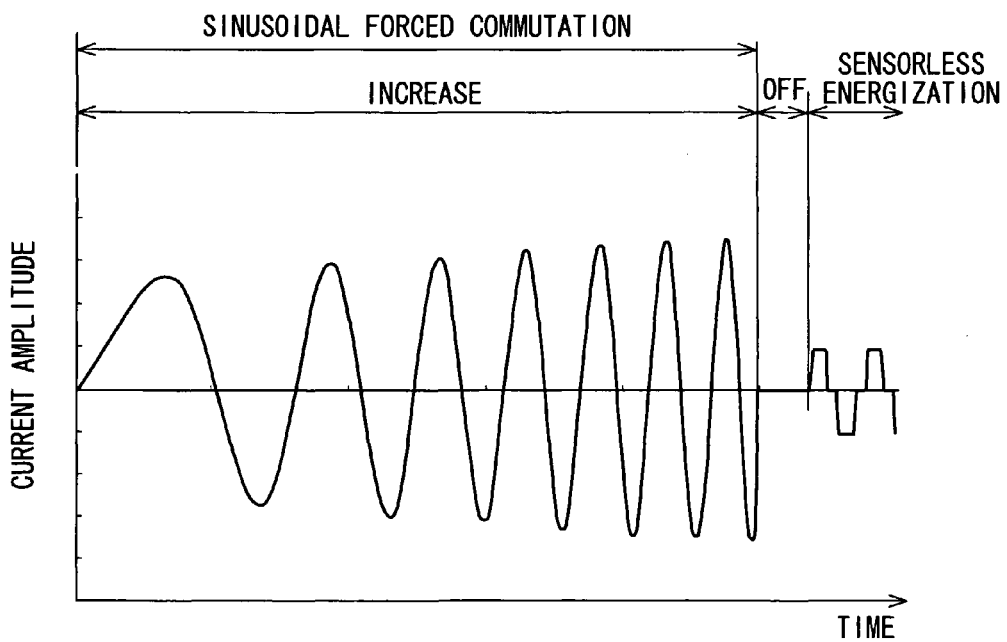
Figure 17:
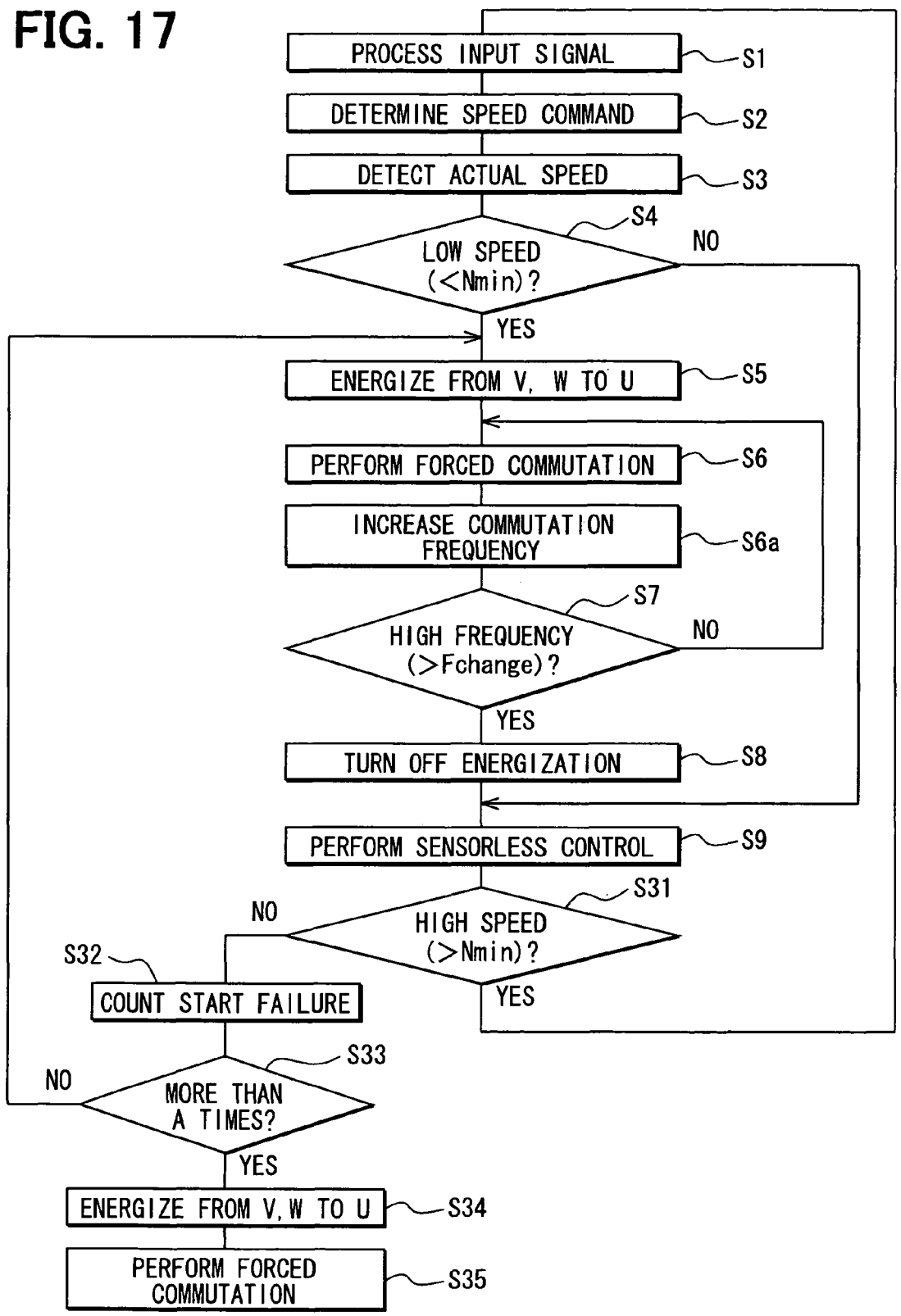
FIG. 17 is a flowchart showing a circuit operation according to an eleventh embodiment of the present invention.
Figure 18:
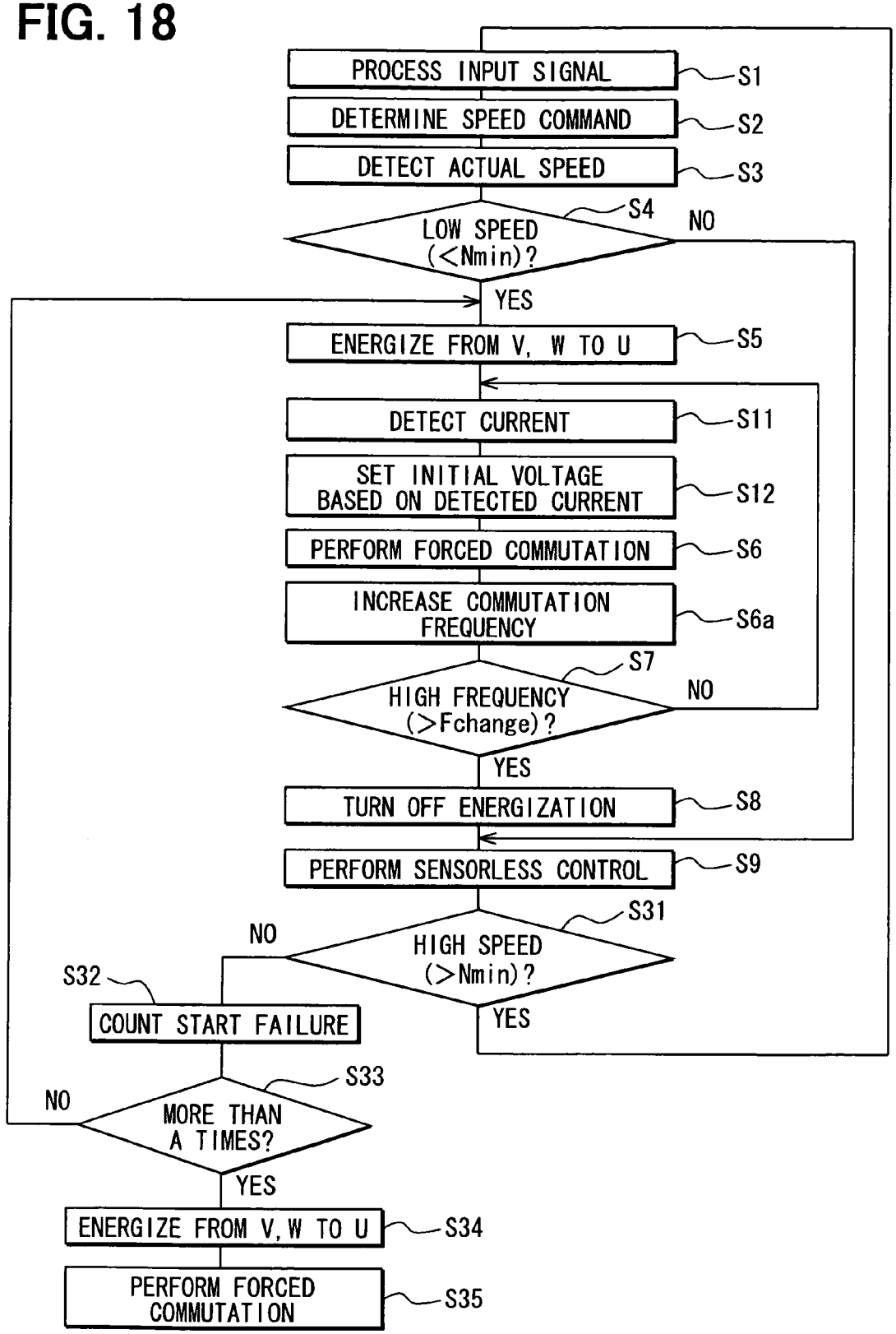
FIG. 18 is a flowchart showing a circuit operation according to a twelfth embodiment of the present invention.
Figure 19:
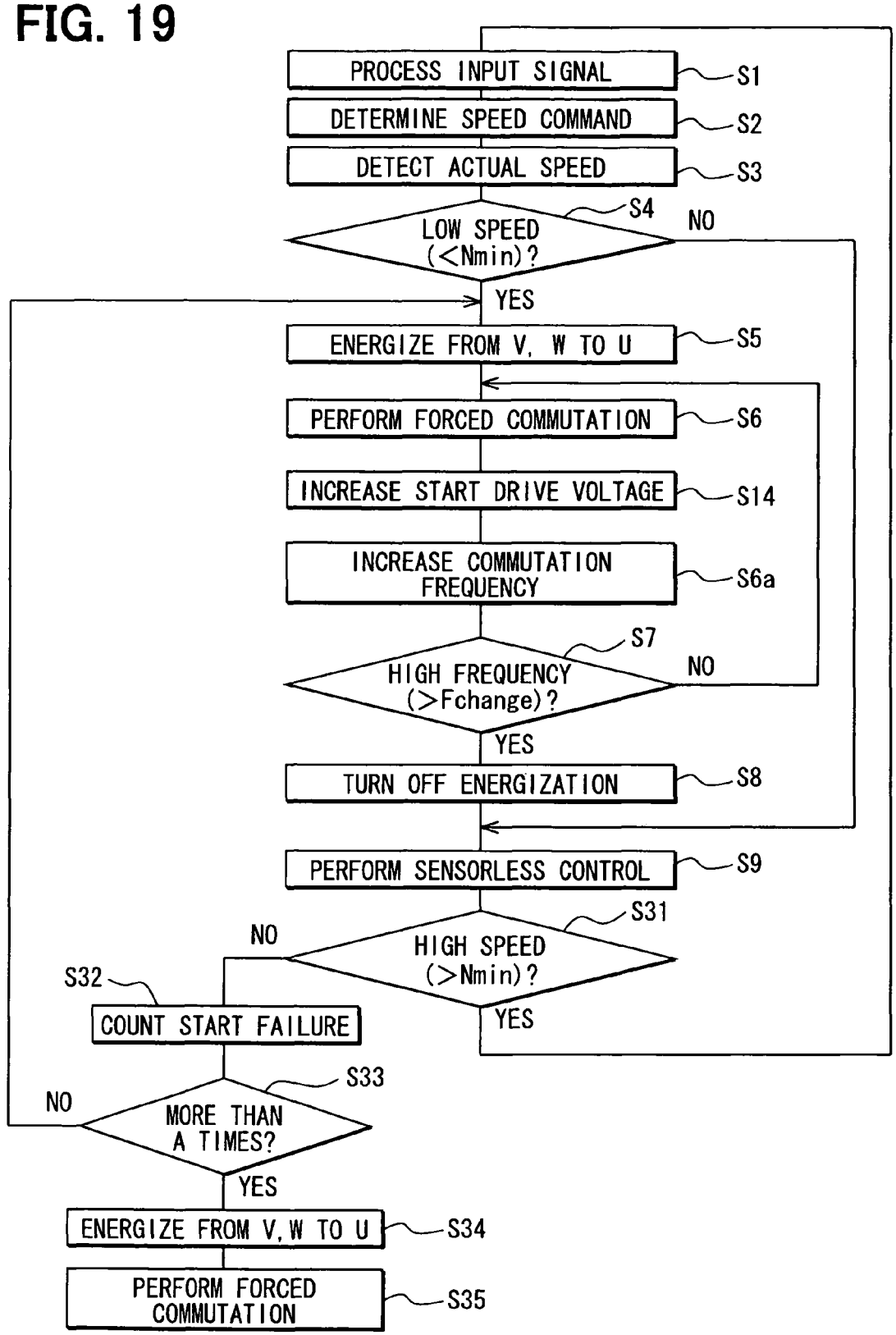
FIG. 19 is a flowchart showing a circuit operation according to a thirteenth embodiment of the present invention.
Figure 20:
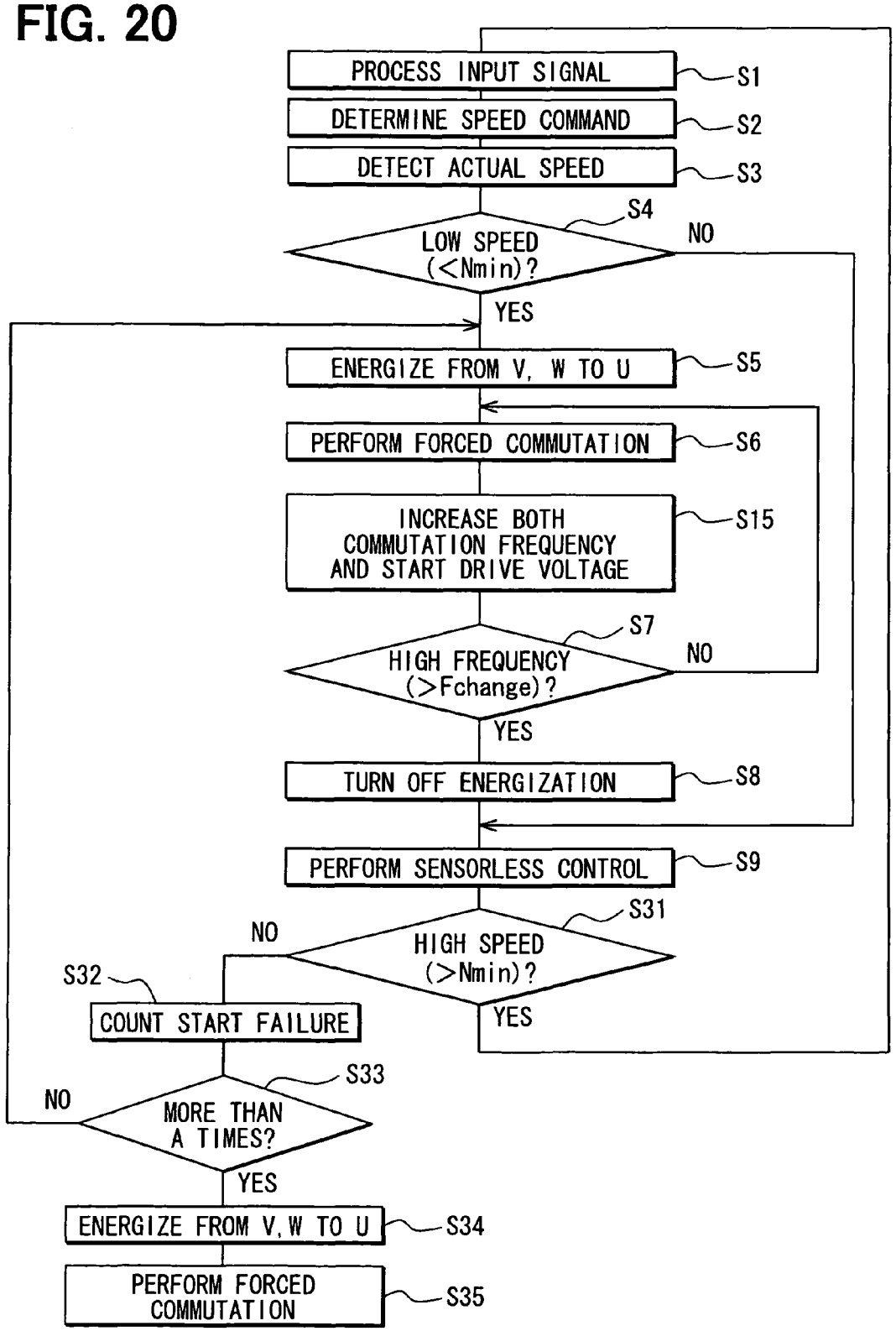
FIG. 20 is a flowchart showing a circuit operation according to a fourteenth embodiment of the present invention.
Figure 21:
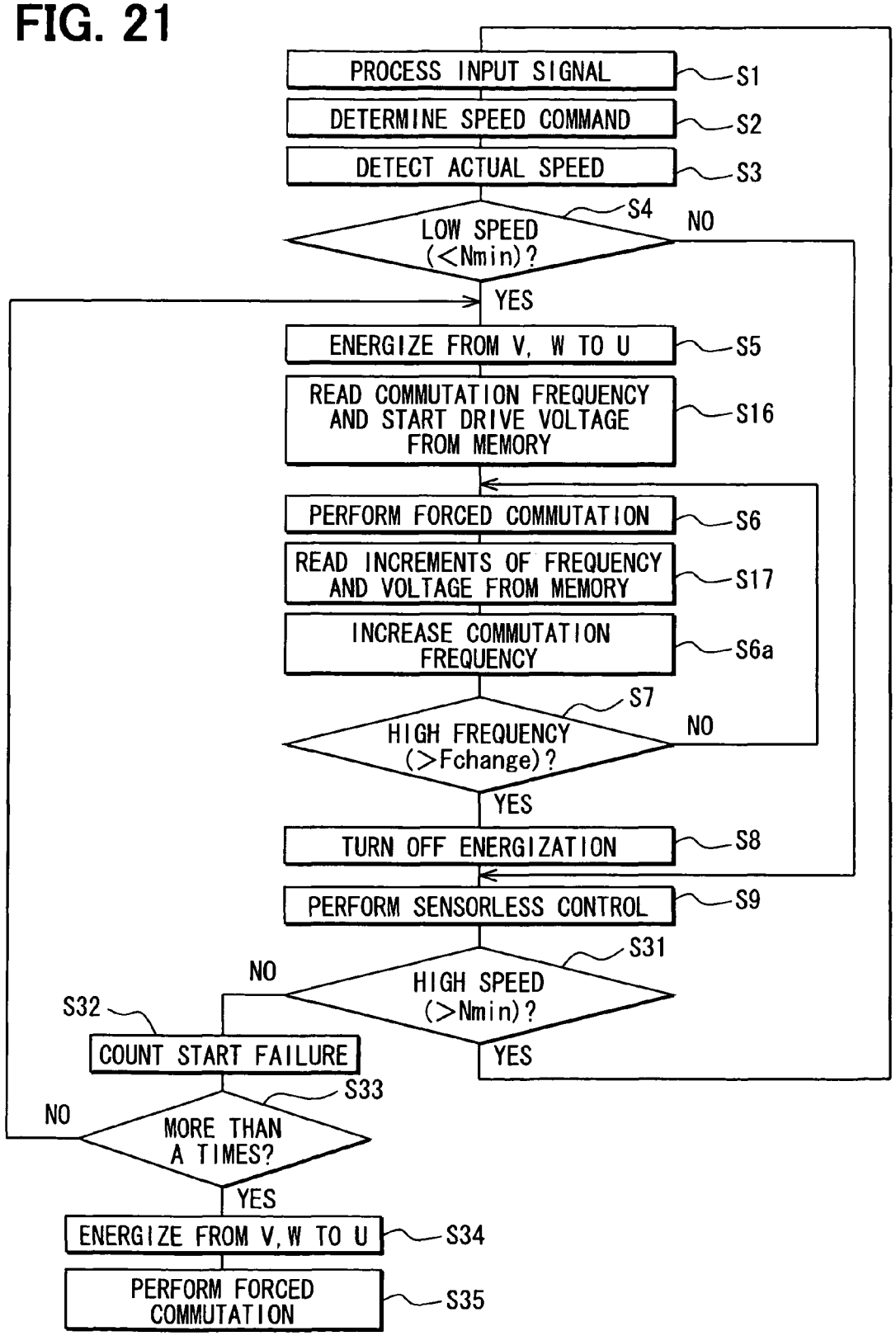
FIG. 21 is a flowchart showing a circuit operation of a fifteenth embodiment of the present invention.
Figure 22:
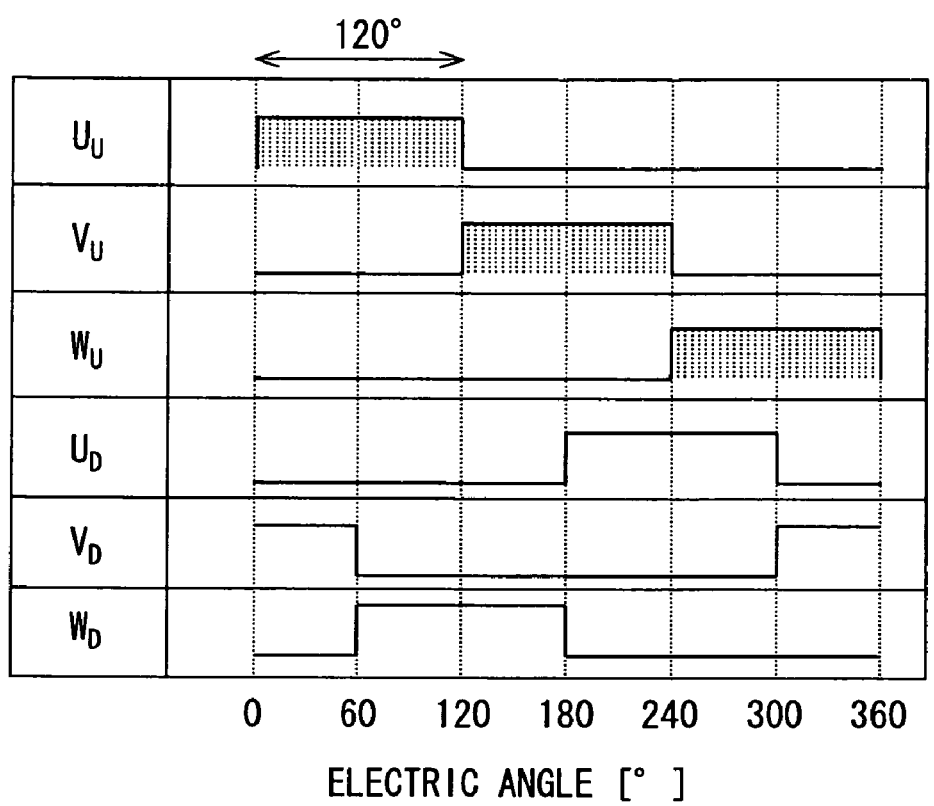
FIG. 22 is a signal diagram showing PWM signal of a conventional rectangular waveform.

FIG. 16A shows a change in the current waveform that is energized in the winding wires 7U to 7W of the motor 7 when the processing of S6 to S9 is executed. In the forced commutation, the applied voltage and the frequency gradually increase. When the frequency reaches Fchange, and the determination of "YES" is performed in S7, the applied voltage is decreased in S25. In this situation, after the applied voltage is decreased so that the amplitude becomes zero at the electric angle of 360°, the energization turns off in S8. FIG. 16B shows a current waveform in the third embodiment in which S25 is not executed for comparison. However, because the current change at timing when the energization turns off becomes precipitous, the drive noises of the motor 7 and the fan 6 are likely to occur.

According to the tenth embodiment, the applied voltage amplitude increases and the energization frequency increases in the initial stage of the forced commutation. When the frequency reaches Fchange, switchover is performed so that the energization of the motor 7 turns off after the voltage amplitude has been reduced. As a result, the current change when the energization turns off is suppressed, thereby enabling the occurrence of the drive noise to be avoided. Then, when the voltage amplitude is reduced, since the amplitude is so reduced as to become zero at the electric angle 360°, the voltage amplitude can be reduced without decreasing the rotation speed of the motor 7.

Eleventh Embodiment

The eleventh embodiment may be configured as in the first embodiment (FIG. 1). As a modification of the first embodiment, after S9 has been executed, it is checked whether the rotation speed of the motor 7 is equal to or higher than a given value Nmin (rpm) or not (S31). In this stage, when the rotation speed is equal to or higher than Nmin (YES), it can be determined that the control normally shifts to the sensorless control. For this reason, the processing returns to S1, and the drive control continues as it is.

On the other hand, when the rotation speed is lower than Nmin (NO), it is determined that the shift to the sensorless control fails, that is, the motor 7 fails to start. For this reason, the number of times of failing to start is counted up by a counter (S32). Then, when the counter value does not reach a given value A (for example, "3") (NO in S33), the processing returns to S5, and the changeover to the forced commutation and the sensorless control from the positioning is retried.

When the failure of shifting to the sensorless control continues, and the value of the start failure number counter becomes equal to or higher than the given value A (YES in S33), after the rotor is positioned as in S5 and S6 (S34), the motor 7 is forcedly commutated by the sinusoidal PWM drive waveform (S35).

That is, when the failure of shifting to the sensorless control is caused by a case in which the operating environment is in a high-temperature state, or a case in which the rotor magnet is rusted, it is presumed that the probability that the shift is successful is extremely low even if the retry is repeated. Accordingly, in that case, when the shift to the sensorless control stops, and the motor is driven by the forced commutation as it is, the motor 7 can be surely driven.

In the eleventh embodiment, in addition to the advantages of the first embodiment, the start control section 23 continues the driving of the motor 7 conducted by the forced commutation as it is when the shift cannot be executed even if the changeover to the sensorless control is tried by a given number of times A. Accordingly, even when the shifting failure is caused by that the operating environment is in the high-temperature state, or that the rotor magnet is rusted, the motor can be surely driven. Then, since the forced commutation in this case is performed by supplying the drive signal whose voltage amplitude gently changes under the complementary PWM control as with the start time, the driving of the motor 7 can be continued while suppressing the occurrence of the drive sound.

Twelfth to Fifteenth Embodiments

The twelfth to fifteenth embodiments shown in FIGS. 18 to 21 are modifications of the second to fifth embodiments (FIGS. 5 to 8), respectively. In each of the twelfth to fifteenth embodiments, S31 to S35 are executed subsequent to S9 as in the eleventh embodiment.

The above embodiments may be modified in various ways as exemplarily described below.

The drive signal waveform under the sensorless control is not limited to the rectangular wave of the 120° energization system, but a signal whose energization angle is less than 180° can be applied.

The pseudo sinusoidal wave that is used as the start drive signal may be a wave whose energization angle is 30° step, and the energization angle needs to be lower than 60°.

The applied voltage of the drive signal at the time of forced commutation may be kept constant as in the first embodiment depending on the load. Also, the frequency and the applied voltage can be set to appropriate values according to the load torque or the inertia moment, for example, the frequency and the applied voltage are initially set to be higher, and thereafter gradually decreased.

When the forced commutation starts, the rotor positioning is not limited to a pattern shown in S5. Also, the rotor can be positioned as the occasion demands.

The period of time during which the energization of the motor is off while the control shifts to the sensorless control from the forced commutation is not limited to the electric angle of 360° or higher, but can be appropriately changed according to the individual designs. Also, whether the energization off period per se is provided or not can be appropriately determined.

The given value A can be appropriately changed and set.

The second embodiment can be applied to the third to eighteenth embodiments.

In the fifteenth embodiment, the memory means may not be the EEPROM.

In the tenth embodiment, when the voltage amplitude is deteriorated in S25, it is not always necessary that the amplitude becomes zero at the electric angle of 360°.

An n-channel MOSFET can be used at the upper arm side of the inverter circuit.

The switching element that constitutes the inverter circuit may be IGBT.

The motor control apparatus is not limited to the apparatus that drives the fan for the vehicle, but can be particularly applied to an apparatus required to reduce the drive sound of the motor at the time of starting.

What is claimed is:

1. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
   start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
   the start drive signal is a pseudo sinusoidal wave that is so set as to change the applied voltage amplitude to the motor in each period with the electric angle of lower than 60°.

2. The motor control apparatus according to claim 1, wherein:
   the start control means is configured to start the forced commutation after the start control means positions a rotor of the motor by a DC energization.

3. The motor control apparatus according to claim 1, wherein:
   the start control means is configured to continue to drive the motor by the forced commutation, when switching to the sensorless control fails a plurality of times.

4. A vehicle fan drive apparatus, comprising:
   the motor control apparatus according to claim 1,
   wherein the vehicle fan drive apparatus drives a fan that is mounted in a vehicle by the motor.

5. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
   start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
   the start drive signal is a pseudo sinusoidal wave that is so set as to change the applied voltage amplitude to the motor in each period with the electric angle of lower than 60°, and
   the start control means is configured to supply the start drive signal of the pseudo sinusoidal wave to the motor through a two-phase modulation method when the motor is of three phases.

6. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
   start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
   the start control means is configured to switch over to the sensorless control after the energization of the motor is turned off for a given period of time after the forced commutation is performed.

7. The motor control apparatus according to claim 6, wherein:
   the start control means is configured to switch over to the sensorless control after the energization of the motor is turned off for a given period of time after the forced commutation is performed until the amplitude of the induced voltage reaches a level that enables the position estimation.

8. The motor control apparatus according to claim 7, wherein:
   the start control means is configured to perform the forced commutation until the amplitude of the induced voltage reaches a level that enables the position estimation, and a drive noise of a load due to the motor becomes equal to or higher than the drive noise of the motor under the sensorless control of the rectangular wave.

9. The motor control apparatus according to claim 6, wherein:
the start control means is configured to switch over the energization of the motor to turn off after an applied voltage amplitude to the motor in the forced commutation decreases.

10. The motor control apparatus according to claim 9, wherein:
the start control means is configured to decrease the voltage amplitude so that the amplitude becomes zero at an electric angle of 360°.

11. The motor control apparatus according to claim 6, wherein:
a period of time during which the energization is turned off is equal to or higher than the electric angle of 360° at a rotation speed when switching over to the sensorless control.

12. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
the start control means is configured to gradually increase the applied voltage amplitude of the start drive signal at the time of the forced commutation in at least an initial stage.

13. The motor control apparatus according to claim 12, wherein:
the start control means includes memory means for storing a parameter initial value and an increment of the start drive signal, and is configured to change the initial value and the increment.

14. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
the start control means is configured to control a frequency and a motor applied voltage amplitude of the start drive signal at the time of the forced commutation at a constant ratio in at least an initial stage, and thereafter increases the frequency and the motor applied voltage amplitude gradually.

15. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied, wherein
the start control means is configured to start the forced commutation after the start control means positions a rotor of the motor by a DC energization,
the motor control apparatus further comprises current detecting means configured to detect a current that flows in the motor at the time of positioning, and
the start control means is configured to variably set the motor applied voltage amplitude of the start drive signal according to a value of the current.

16. A motor control apparatus that controls driving of a brushless DC motor through a sensorless control system that performs position estimation by an induced voltage that is developed in a non-energization period, and performs energization at an energization period of an electric angle of lower than 180°, the motor control apparatus comprising:
start control means configured to switch over to the sensorless control after starting the motor by a forced commutation of a start drive signal whose applied voltage amplitude to the motor gently changes under a complementary PWM control upon receiving a start command when the motor is in a stop state or a low-speed rotating state where the sensorless control cannot be applied; and
temperature detecting means configured to detect a temperature of a circuit interior, wherein the start control means is configured to refer to the temperature that is detected by the temperature detecting means upon receiving the start command, supplies a drive signal caused by the complementary PWM control to start the motor when the temperature is equal to or lower than a given value, and supplies a rectangular wave drive signal caused by one-side PWM control to start the motor when the temperature exceeds the given value.

17. The motor control apparatus according to claim 16, wherein
the given value is set so that the result of executing the PWM control keeps the temperature of the circuit within a rated temperature range of an internal element.

18. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control; and
switching over to the sensorless control after starting the motor by the forced commutation by the drive signal, wherein
a waveform of the start drive signal is a pseudo sinusoidal wave that is so set as to change the motor applied voltage amplitude in each period with the electric angle of lower than 60°.

19. The motor control method according to claim 18, further comprising:
starting the forced commutation after positioning a rotor of the motor by a DC energization.

20. The motor control method according to claim 18, further comprising:
continuing the force commutation to drive the motor, when switching to the sensorless control fails a plurality of times.

21. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control; and
switching over to the sensorless control after starting the motor by the forced commutation by the drive signal, wherein
a waveform of the start drive signal is a pseudo sinusoidal wave that is so set as to change the motor applied voltage amplitude in each period with the electric angle of lower than 60°, and
the start drive signal of the pseudo sinusoidal wave is supplied to the motor through a two-phase modulation method when the motor is of three phases.

22. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control;
switching over to the sensorless control after starting the motor by the forced commutation by the drive signal; and
turning off motor energization for a given period of time after performing the forced commutation.

23. The motor control method according to claim 22, wherein:
the motor energization is turned off after performing the forced commutation until the amplitude of the induced voltage reaches a level that enables the position estimation.

24. The motor control method according to claim 22, wherein:
the motor energization is turned off after performing the forced commutation until the amplitude of the induced voltage reaches a level that enables the position estimation, and a drive noise of a load by the motor becomes equal to or higher than the drive noise of the motor under the sensorless control of a rectangular wave.

25. The motor control method according to claim 22, further comprising:
decreasing the motor applied voltage amplitude before turning off the motor energization.

26. The motor control method according to claim 25, wherein:
the motor applied voltage amplitude is decreased so that the amplitude becomes zero at an electric angle of 360°.

27. The motor control method according to claim 22, wherein:
a period of time during which the energization is turned off is set to be 360° or higher as the electric angle at a rotation speed when switching over to the sensorless control.

28. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control;
switching over to the sensorless control after starting the motor by the forced commutation by the drive signal; and
increasing gradually the motor applied voltage amplitude of the start drive signal at the time of the forced commutation in at least an initial stage.

29. The motor control method according to claim 28, further comprising:
changing the start drive signal based on a parameter initial value and an increment of the start drive signal stored in memory means.

30. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control;
switching over to the sensorless control after starting the motor by the forced commutation by the drive signal; and
controlling a frequency and a motor applied voltage amplitude of the start drive signal at the time of the forced commutation at a constant ratio in at least an initial stage, and thereafter increases the frequency and the motor applied voltage amplitude gradually.

31. A method of controlling driving of a brushless DC motor through a sensorless control system that performs position estimation by an induced voltage that is developed in a non-energization period, and performs energization at an energization period of an electric angle of lower than 180°, the method comprising:
checking whether the motor is in a stop state or a low-speed rotating state where the sensorless control cannot be applied, when a start command is received;
performing a forced commutation of the motor by a drive signal whose motor applied voltage amplitude gently changes under a complementary PWM control;

switching over to the sensorless control after starting the motor by the forced commutation by the drive signal, and further comprising;

starting the forced commutation after positioning a rotor of the motor by a DC energization;

detecting a current that flows in the motor at the time of positioning; and variably setting the motor applied voltage amplitude of the start drive signal according to a detected value of the current.

32. A method of controlling driving of a brushless DC motor through a sensorless control system that performs position estimation by an induced voltage that is developed in a non-energization period, and performs energization at an energization period of an electric angle of lower than 180°, the method comprising:

checking whether the motor is in a stop state or a low-speed rotating state where the sensorless control cannot be applied, when a start command is received;

performing a forced commutation of the motor by a drive signal whose motor applied voltage amplitude gently changes under a complementary PWM control;

switching over to the sensorless control after starting the motor by the forced commutation by the drive signal;

detecting a temperature upon receiving the start command;

supplying the drive signal caused by the complementary PWM control to start the motor when the temperature is equal to or lower than a given value; and supplying a rectangular wave drive signal caused by one-side PWM control to start the motor when the temperature exceeds the given value.

33. The motor control method according to claim 32, wherein:

the given value is set so that the result of executing the PWM control keeps the temperature of the circuit within a rated temperature range of an internal element.

* * * * *